US012647566B2

(12) United States Patent
Zhang et al.

(10) Patent No.: US 12,647,566 B2
(45) Date of Patent: Jun. 2, 2026

(54) REFINED QUANTIZATION STEPS IN VIDEO CODING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/676,224

(22) Filed: May 28, 2024

(65) Prior Publication Data

US 2024/0323380 A1    Sep. 26, 2024

Related U.S. Application Data

(63) Continuation of application No. 17/376,001, filed on Jul. 14, 2021, now Pat. No. 11,997,277, which is a (Continued)

(30) Foreign Application Priority Data

Jan. 31, 2019    (WO) ............... PCT/CN2019/074113

(51) Int. Cl.
 H04N 19/124    (2014.01)
 H04N 19/176    (2014.01)
 (Continued)

(52) U.S. Cl.
 CPC ......... H04N 19/124 (2014.11); H04N 19/176 (2014.11); H04N 19/186 (2014.11); H04N 19/46 (2014.11)

(58) Field of Classification Search
 CPC .. H04N 19/105; H04N 19/124; H04N 19/176; H04N 19/186; H04N 19/46; H04N 19/513; H04N 19/577
 See application file for complete search history.

(56) References Cited

U.S. PATENT DOCUMENTS 7,916,783 B2    3/2011   Gao
8,891,619 B2   11/2014   Leontaris
(Continued)

FOREIGN PATENT DOCUMENTS

CN       101971635 A      2/2011
CN       102428702 A      4/2012
(Continued)

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
(Continued)

*Primary Examiner* — Md N Haque
(74) *Attorney, Agent, or Firm* — Conley Rose, P.C.

(57) ABSTRACT

The application relates to refined quantization steps in video coding. A method for video processing includes determining, during a conversion between a current video block and a bitstream representation of a video including the current video block, two-level quantization parameters including a first level quantization parameter QP1 and a second level quantization parameter QP2 for the current video block. The method further includes performing, at least based on the (Continued)

2600 performing a conversion between a video and a bitstream representation of the video using a quantization scheme using a relationship between positions of coefficients in a video block and corresponding quantization step sizes or rounding offsets ---- 2602

2800 performing, at least based on a quantization step, a rounding offset and a quantization parameter, a quantization during a conversion between a current video block and a bitstream representation of the current video block ---- 2802 two-level quantization parameters, a first level quantization and/or a second level quantization during the conversion. The two-level quantization parameters correspond to different quantization precisions, respectively.

20 Claims, 28 Drawing Sheets

Related U.S. Application Data continuation of application No. PCT/CN2020/074121, filed on Jan. 31, 2020.

(51) Int. Cl.
H04N 19/186 (2014.01)
H04N 19/46 (2014.01)

(56) References Cited

U.S. PATENT DOCUMENTS

| | | | | |
|---|---|---|---|---|
| 9,736,481 | B2 | 8/2017 | Zhang | |
| 9,883,184 | B2 | 1/2018 | Rapaka | |
| 10,057,578 | B2 | 8/2018 | Rapaka | |
| 10,142,642 | B2 | 11/2018 | Zhang | |
| 10,200,719 | B2 | 2/2019 | Zhang | |
| 10,218,975 | B2 | 2/2019 | Chien | |
| 10,257,514 | B2* | 4/2019 | Zhao | H04N 19/126 |
| 10,277,910 | B2 | 4/2019 | Xiu | |
| 10,368,051 | B2 | 7/2019 | Jiang | |
| 10,469,847 | B2 | 11/2019 | Xiu | |
| 10,659,783 | B2 | 5/2020 | Li | |
| 10,757,405 | B2 | 8/2020 | Oh | |
| 11,197,021 | B2 | 12/2021 | Mao | |
| 11,611,750 | B2 | 3/2023 | Schwarz | |
| 2008/0225944 | A1 | 9/2008 | Pore | |
| 2011/0051807 | A1* | 3/2011 | Liu | H04N 19/149 |
| | | | | 375/240.03 |
| 2012/0183053 | A1* | 7/2012 | Lu | H04N 19/159 |
| | | | | 375/240.03 |
| 2012/0307890 | A1 | 12/2012 | Lu | |
| 2013/0022108 | A1 | 1/2013 | Panusopone | |
| 2013/0182971 | A1 | 7/2013 | Leontaris | |
| 2013/0330012 | A1 | 12/2013 | Sato | |
| 2013/0336407 | A1* | 12/2013 | Chen | H04N 19/513 |
| | | | | 375/240.16 |
| 2014/0003497 | A1* | 1/2014 | Sullivan | H04N 19/70 |
| | | | | 375/240.03 |
| 2015/0215621 | A1 | 7/2015 | Liu | |
| 2015/0312570 | A1 | 10/2015 | Song | |
| 2015/0319439 | A1* | 11/2015 | Jang | H04N 19/132 |
| | | | | 375/240.03 |
| 2015/0373327 | A1 | 12/2015 | Zhang | |
| 2016/0205403 | A1 | 7/2016 | Huang | |
| 2018/0199072 | A1* | 7/2018 | Li | H04N 19/186 |
| 2018/0255302 | A1* | 9/2018 | Galpin | H04N 19/186 |
| 2018/0309995 | A1 | 10/2018 | He | |
| 2019/0158837 | A1 | 5/2019 | Zhang | |
| 2020/0037002 | A1* | 1/2020 | Xu | H04N 19/18 |
| 2020/0244962 | A1 | 7/2020 | Li | |
| 2020/0288134 | A1* | 9/2020 | Lim | H04N 19/129 |
| 2020/0288159 | A1 | 9/2020 | Van der Auwera | |
| 2020/0296417 | A1* | 9/2020 | Ko | H04N 19/70 |
| 2020/0359024 | A1 | 11/2020 | Misra | |
| 2021/0084304 | A1 | 3/2021 | Schwarz | |
| 2021/0195226 | A1 | 6/2021 | Zhao | |
| 2021/0227221 | A1 | 7/2021 | Lim | |
| 2021/0352316 | A1 | 11/2021 | Oh | |
| 2021/0358085 | A1 | 11/2021 | Jang | |
| 2022/0078465 | A1 | 3/2022 | Kim | |

FOREIGN PATENT DOCUMENTS

| | | | | |
|---|---|---|---|---|
| CN | 104754357 | A | * | 7/2015 |
| CN | 106604036 | A | | 4/2017 |
| KR | 20120008323 | A | | 1/2012 |

OTHER PUBLICATIONS httpsvcgit.hhi.fraunhofer.dejvetVVCSoftware_VTMtagsVTM-2.1, May 28, 2024.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Sethuraman, Sriram. "CE9: Results of DMVR Related Tests CE9. 2.1 and CE9.2.2," Joint Video Experts Team (JVET) of ITU-T SG 16 WP 3 and 1SO/IEC JTC 1/SC 29/WG 11, 13th Meeting, Marrakech, MA, Jan. 9-18, 2019, document JVET-M0147, 2019.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.

Lee et al. "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting, Macau, CN, Oct. 8-12, 2018, document JVET-L0142, 2018.

Chen et al. "Crosscheck of JVET-L0142 (CE4: Simplification of the Common Base for Affine Merge (Test 4.2.6)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

Zhang et al. "CE4: Affine Prediction with 4x4 Sub-Blocks for Chroma Components (Test 4. 1.16)," Joint Video Experts Team (JVET) of ITU-T SG 16 WP 3 and 1SO/IEC JTC 1/SC 29/WG 11 12th Meeting, Macao, CN, Oct. 3-12, 2018, document JVET-L0265, 2018.

Lu et al. "CE12: Mapping Functions {Test CE12-1 and CE12-2)," Joint Video Experts Team {JVET) of ITU-t SG 16 WP 3 and ISO/IEC JTC 1/SC 29/WG 11, 13th Meeting, Marrakech, MA, Jan. 9-18, 2019, document JVET-M0427, 2019.

"Information Technology—High Efficiency Coding and Media Delivery in Heterogeneous Environments—Part 2: High Efficiency Video Coding" Apr. 20, 2018, ISO/DIS 23008, 4th Edition.

Rosewarne et al. "High Efficiency Video Coding (HEVC) Test Model 16 (HM 16) Improved Encoder Description 10 Update 7," Joint Collaborative Team on Video Coding (JCT-VC) ITU-T SG 16 WP3 and ISO/IEC JTC1/SC29/WG11, 15th Meeting, Chengdu, CN, Oct. 14-21, 2016, document JCTVC-Y1002, 2016.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVETG1001, 2017.

JEM-7.0 httpsjvet.hhi.fraunhofer.desvnsvn_HMJEMSoftwaretags HM-16.6-JEM-7.0, May 28, 2024.

Chen et al. "CE4: Separate List for Sub-Block Merge Candidates (Test 4.2.8)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0369, 2018.

Schwarz et al. "CE7: Transform Coefficient Coding and Dependent Quantization (Tests 7.1.2, 7.2.1)," Joint Video Experts Team (JVET) of ITU-T SG 16 WP 3 and 1SO/IEC JTC 1/SC 29/WG 11, 11th Meeting, Ljubljana, SI, Jul. 10-18, 2018, document JVET-K0071, 2018.

International Search Report and Written Opinion from International Patent Application No. PCT/CN2020/07 4121 dated Apr. 24, 2020 (10 pages).

Non-Final Office Action from U.S. Appl. No. 17/376,001 dated Jul. 17, 2023, 21 pages.

* cited by examiner (b)second PU of 2NxN (a) second PU of Nx2N

FIG. 7

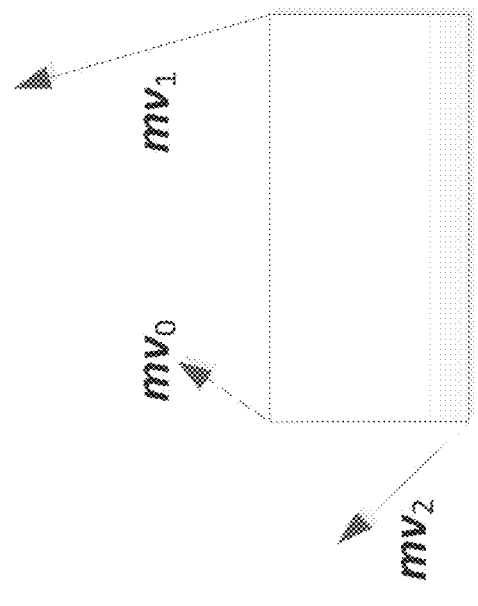
FIG. 14B
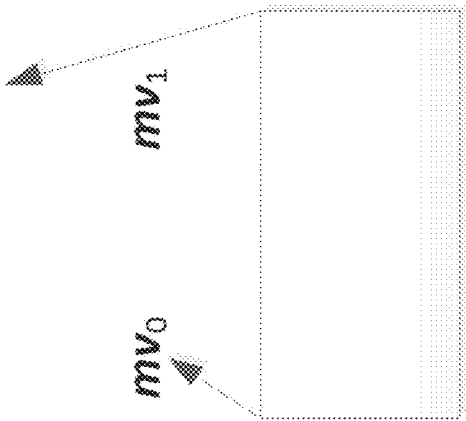
FIG. 14A

2500

2502 performing, using a multi-level quantizer, a conversion between a video and a bitstream representation of the video

2600

2602 performing a conversion between a video and a bitstream representation of the video using a quantization scheme using a relationship between positions of coefficients in a video block and corresponding quantization step sizes or rounding offsets

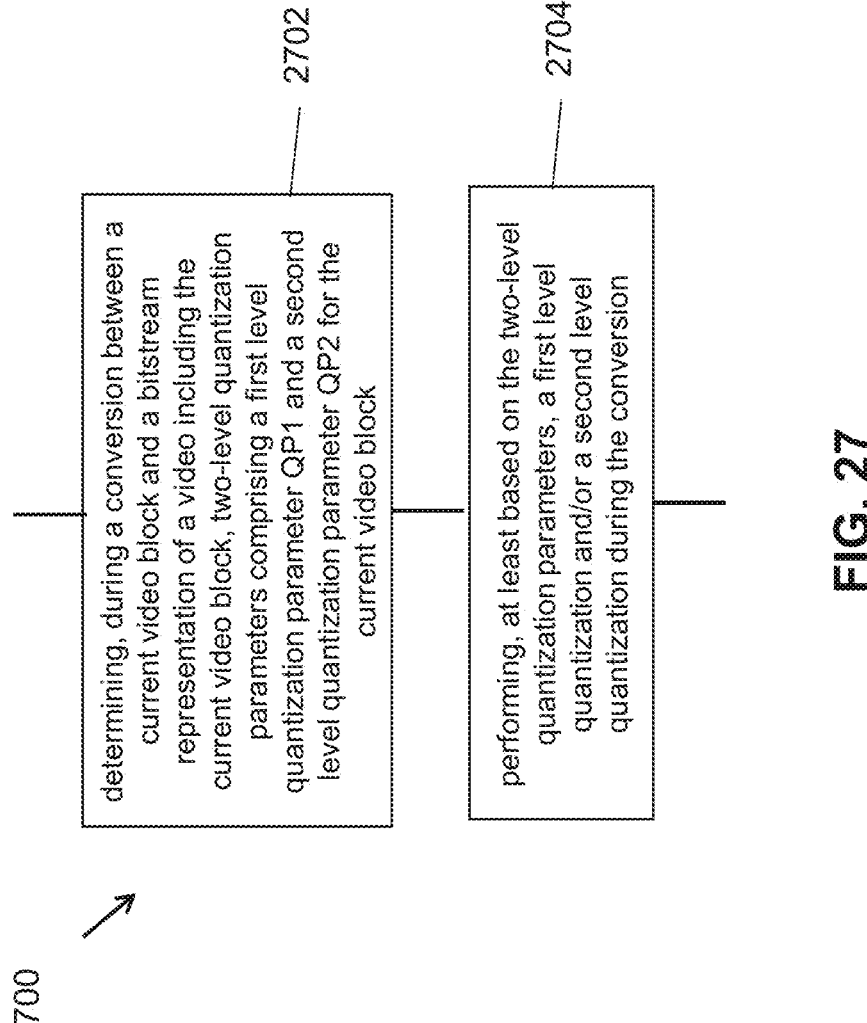

2700

2702 determining, during a conversion between a current video block and a bitstream representation of a video including the current video block, two-level quantization parameters comprising a first level quantization parameter QP1 and a second level quantization parameter QP2 for the current video block

2704 performing, at least based on the two-level quantization parameters, a first level quantization and/or a second level quantization during the conversion

2802 performing, at least based on a quantization step, a rounding offset and a quantization parameter, a quantization during a conversion between a current video block and a bitstream representation of the current video block

REFINED QUANTIZATION STEPS IN VIDEO CODING

CROSS REFERENCE TO RELATED APPLICATIONS

This application is a continuation of U.S. application Ser. No. 17/376,001, filed on Jul. 14, 2021, which is a continuation of International Patent Application No. PCT/CN2020/074121, filed on Jan. 31, 2020, which claims the priority to and benefits of International Patent Application No. PCT/CN2019/074113, filed on Jan. 31, 2019. All the aforementioned patent applications are hereby incorporated by reference in their entireties.

TECHNICAL FIELD

This disclosure is related to video and image coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for quantizing or dequantizing coefficients representing visual content during encoding or decoding.

In one example aspect, a method of processing video is disclosed. The method includes performing, using a multi-level quantizer, a conversion between a video and a bitstream representation of the video. The multi-level quantizer includes at least a first level quantization that uses a first quantization precision and/or a second level quantization that uses a second quantization precision different from the first quantization precision. The first level quantization and the second level quantization are selectively enabled for a current video block depends on a multi-level quantization (MLQ) rule.

In one example aspect, a method of processing video is disclosed. The method includes determining, during a conversion between a current video block and a bitstream representation of a video including the current video block, two-level quantization parameters comprising a first level quantization parameter QP1 and a second level quantization parameter QP2 for the current video block; and performing, at least based on the two-level quantization parameters, a first level quantization and/or a second level quantization during the conversion, wherein the two-level quantization parameters correspond to different quantization precisions respectively.

In one example aspect, a method of processing video is disclosed. The method includes performing, at least based on a quantization step, a rounding offset and a quantization parameter, a quantization during a conversion between a current video block and a bitstream representation of the current video block, wherein the quantization step is smaller than $2^{1/6}$, and the quantization step and/or the rounding offset for the current video block is signaled in the bitstream representation.

In another example aspect, another method of video processing is disclosed. The method includes performing a conversion between a video and a bitstream representation of the video using a quantization scheme using a relationship between positions of coefficients in a video block and corresponding quantization step sizes or rounding offsets.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present disclosure.

BRIEF DESCRIPTION OF THE DRAWINGS

FIG. 7 shows an example of combined bi-predictive merge candidate.

FIGS. 14A-14B show another example of 4-parameter and 6-parameter affine models, respectively.

FIG. 27 is a flowchart for an example of a video processing method.

DETAILED DESCRIPTION

Figure 1:
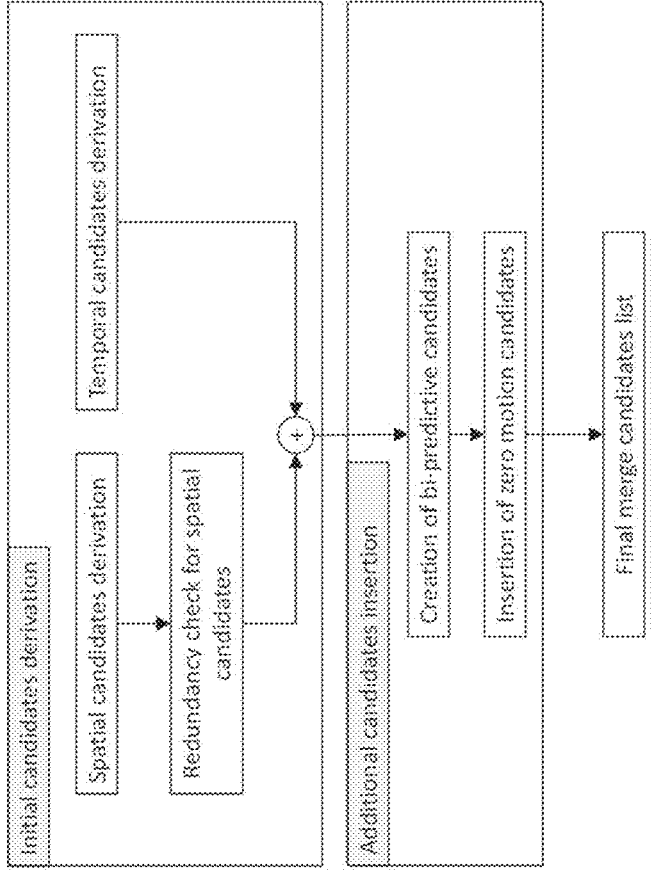
FIG. 1 shows an example derivation process for merge candidates list construction.

The present disclosure provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present disclosure for case of understanding and do not limit the embodiments and techniques to the corresponding sections. As such, embodiments from one section can be combined with embodiments from other sections.

1. Summary

This disclosure is related to video coding technologies. Specifically, it is related to quantization step signalling and interactions of block-based in-loop reshaping with other tools in video coding. It may be applied to the existing video coding standard like HEVC, or the standard Versatile Video Coding (VVC) to be finalized. It may be also applicable to future video coding standards or video codec.

2. Initial Discussion

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC Joint Technical Committee (JTC1) SC29/WG11 (MPEG) was created to work on the VVC standard targeting at 50% bitrate reduction compared to HEVC.

2.1 Inter Prediction

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2 Spatial Candidates Derivation

Figure 2:
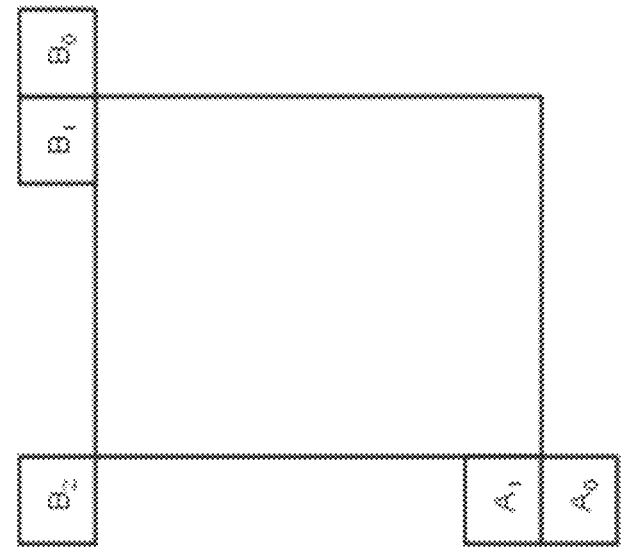
FIG. 2 shows example positions of spatial merge candidates.
Figure 3:
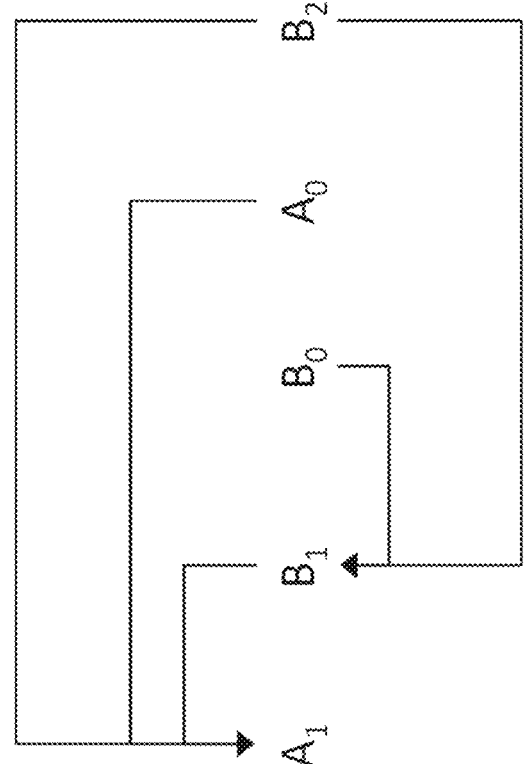
FIG. 3 shows example candidate pairs considered for redundancy check of spatial merge candidates.
Figure 4B:
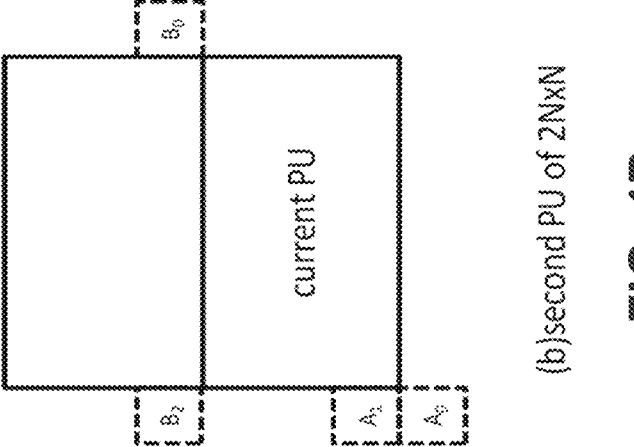
FIGS. 4A-4B show example positions for the second prediction unit (PU) of N×2N and 2N×N partitions.
Figure 4A:
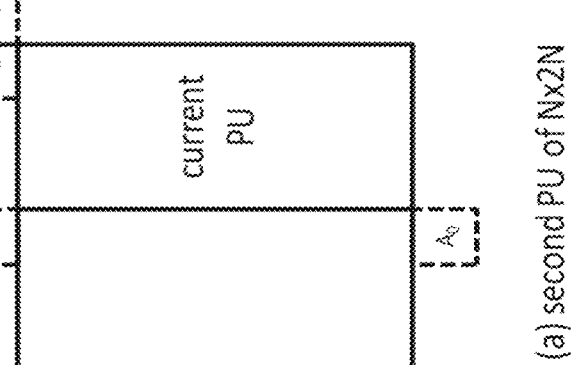

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position Ai is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3 Temporal Candidates Derivation

Figure 5:
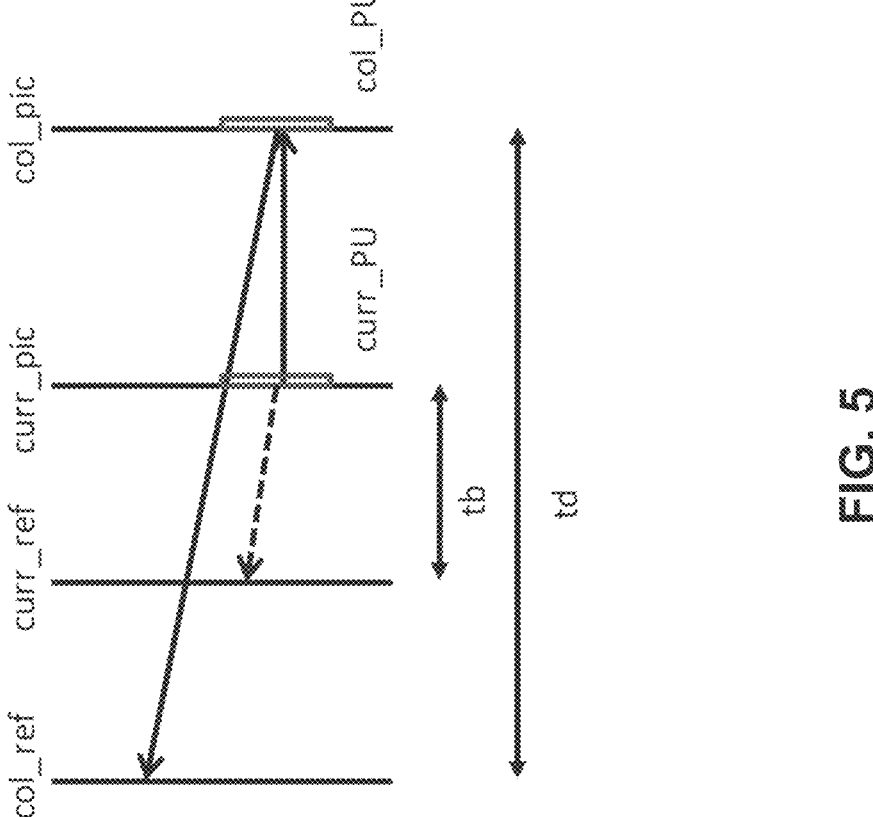
FIG. 5 is an illustration of motion vector scaling for temporal merge candidate.

In this step, only one candidate is added to the list. Particularly, in the derivation of this temporal merge candidate, a scaled motion vector is derived based on co-located PU belonging to the picture which has the smallest picture order count (POC) difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
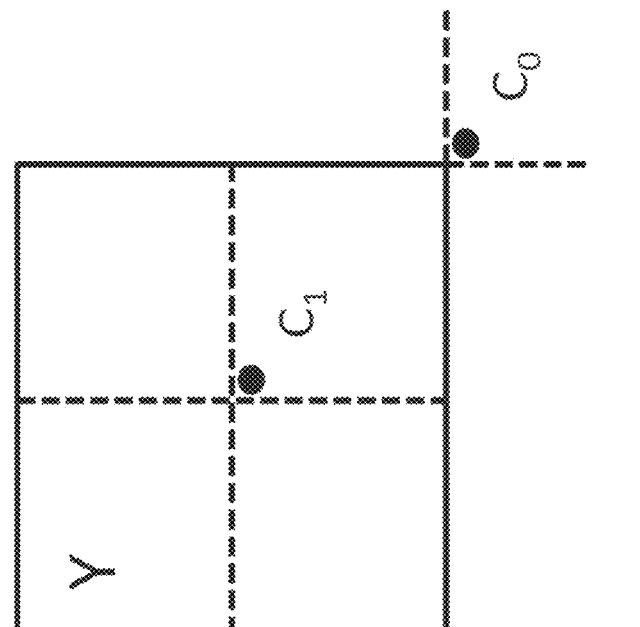
FIG. 6 shows examples of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position Co is not available, is intra coded, or is outside of the current coding tree unit (CTU a.k.a., largest coding unit (LCU)) row, position $C_1$ is used. Otherwise, position $C_0$ is used in the derivation of the temporal merge candidate.

2.1.2.4 Additional Candidates Insertion

Figure 7:
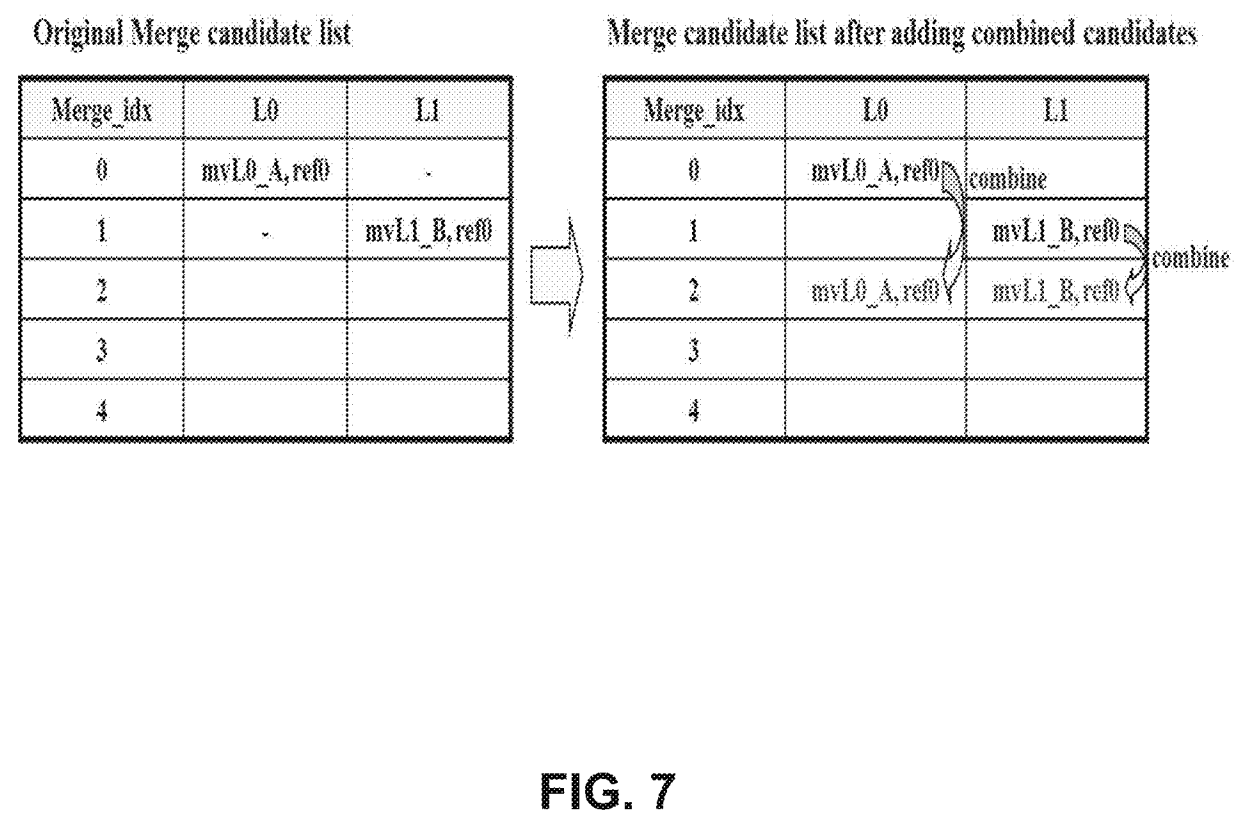

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 AMVP

AMVP exploits spatio-temporal correlation of motion vector with neighbouring PUS, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
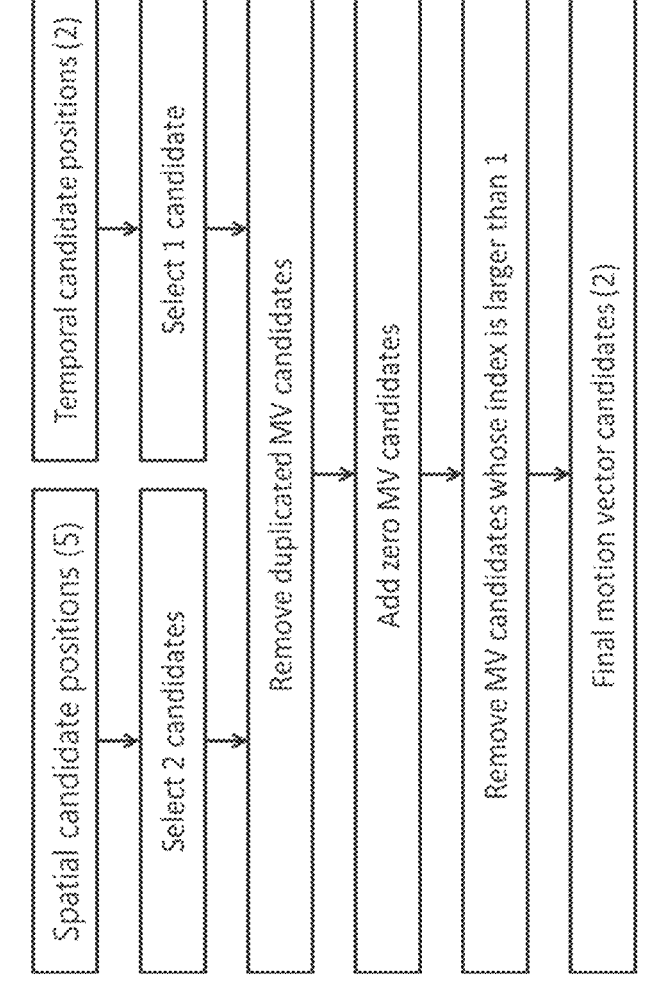
FIG. 8 is an example of a derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
    (1) Same reference picture list, and same reference picture index (same POC)
    (2) Different reference picture list, but same reference picture (same POC)
Spatial scaling
    (3) Same reference picture list, but different reference picture (different POC)
    (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
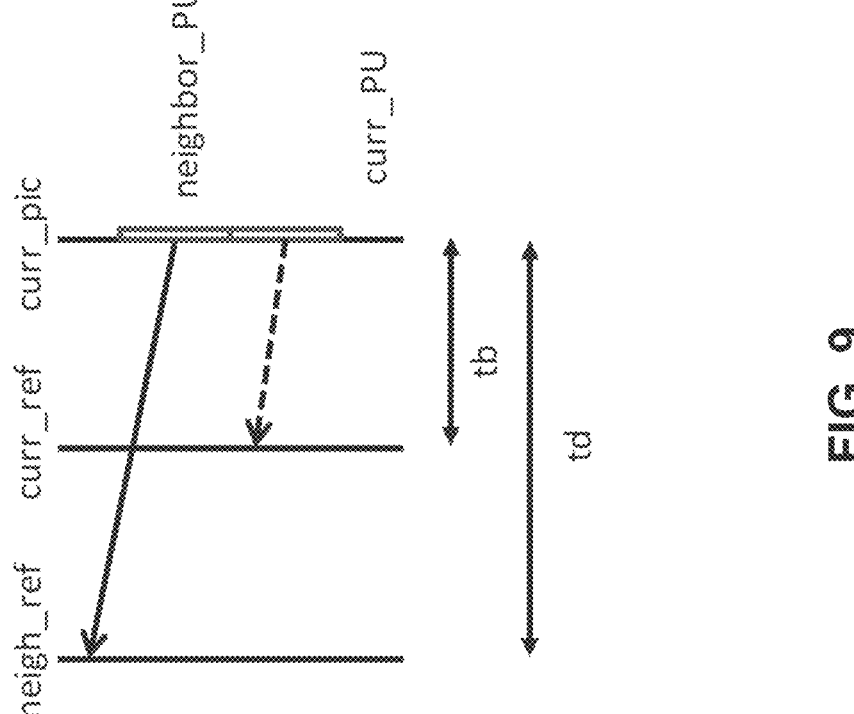
FIG. 9 is an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Sub-CU Based Motion Vector Prediction Methods

In the JEM with quad tree binary tree (QTBT), each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.2.1 Alternative Temporal Motion Vector Prediction

Figure 10:
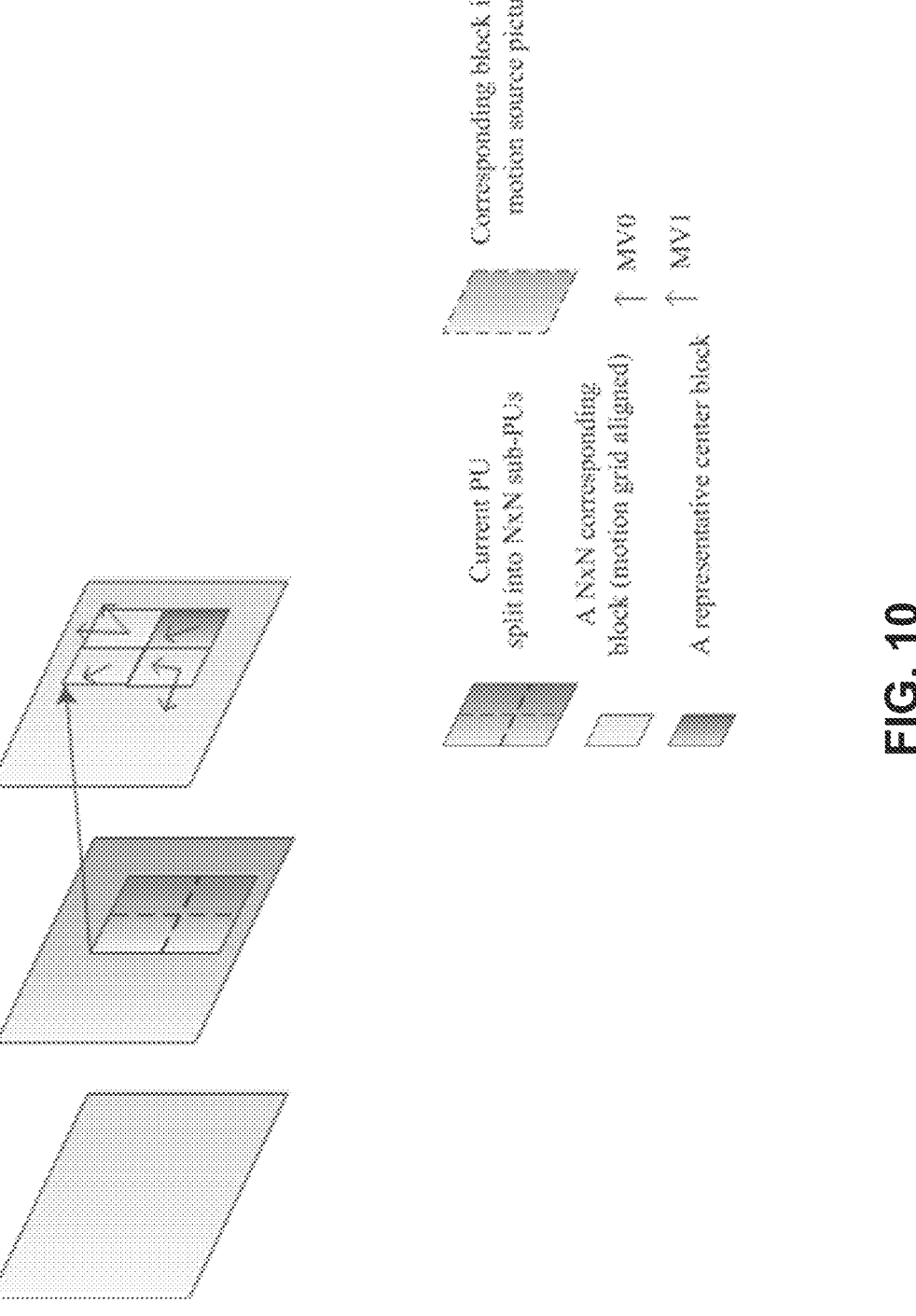
FIG. 10 shows an example of alternative temporal motion vector prediction (ATMVP) motion prediction for a coding unit (CU).

FIG. 10 shows an example of ATMVP motion prediction for a CU.

In the alternative temporal motion vector prediction (ATMVP) method, the motion vectors temporal motion vector prediction (TMVP) is modified by fetching multiple sets of motion information (including motion vectors and reference indices) from blocks smaller than the current CU. The sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to $1-X$) for each sub-CU.

2.2.2 Spatial-Temporal Motion Vector Prediction (STMVP)

Figure 11:
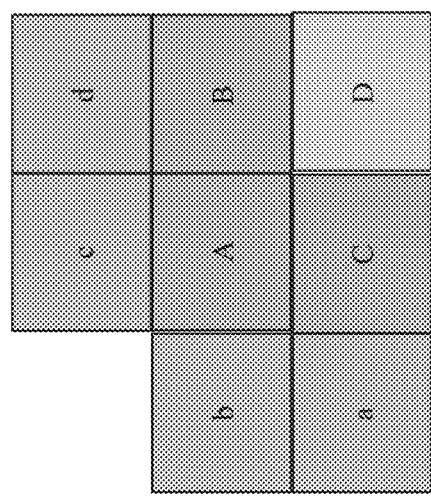
FIG. 11 shows an example of one CU with four sub-blocks (A-D) and its neighbouring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more rate distortion (RD) checks is needed for the two additional merge candidates.

In the JEM, all bins of merge index is context coded by context-adaptive binary arithmetic coding (CABAC). While in HEVC, only the first bin is context coded and the remaining bins are context by-pass coded.

2.3 Inter Prediction Methods in VVC

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.3.1 Coding block structure

In VVC, a QuadTree/BinaryTree/MulitpleTree (QT/BT/TT) structure is adopted to divide a picture into square or rectangle blocks.

Besides QT/BT/TT, separate tree (a.k.a., Dual coding tree) is also adopted in VVC for I-frames. With separate tree, the coding block structure are signaled separately for the luma and chroma components.

2.3.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.3.3 Affine Motion Compensation Prediction

Figures 12A, 12B:
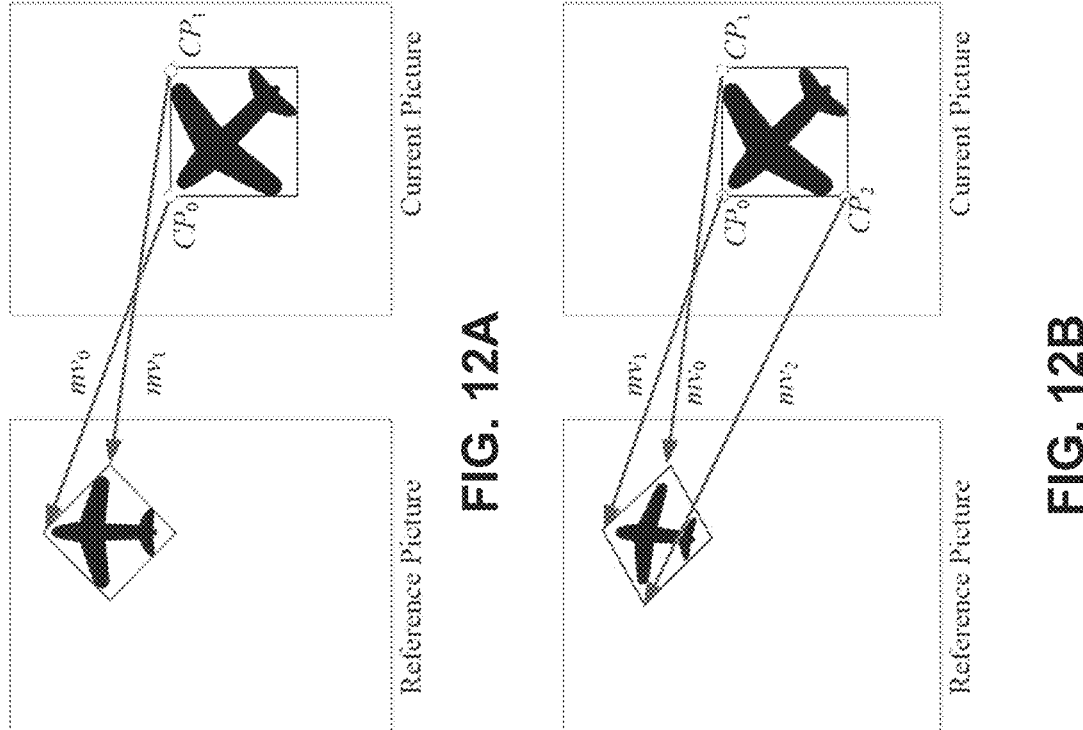
FIGS. 12A-12B illustrate simplified affine motion models for 4-parameter and 6-parameter affine models, respectively.

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown in FIGS. 12A-12B, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$
\begin{cases}
mv^h(x, y) = ax - by + e = \dfrac{(mv_1^h - mv_0^h)}{w}x - \dfrac{(mv_1^v - mv_0^v)}{w}y + mv_0^h \\[2mm]
mv^v(x, y) = bx + ay + f = \dfrac{(mv_1^v - mv_0^v)}{w}x + \dfrac{(mv_1^h - mv_0^h)}{w}y + mv_0^v
\end{cases}
\tag{1}
$$

$$
\begin{cases}
mv^h(x, y) = ax + cy + e = \dfrac{(mv_1^h - mv_0^h)}{w}x + \dfrac{(mv_2^h - mv_0^h)}{h}y + mv_0^h \\[2mm]
mv^v(x, y) = bx + dy + f = \dfrac{(mv_1^v - mv_0^v)}{w}x + \dfrac{(mv_2^v - mv_0^v)}{h}y + mv_0^v
\end{cases}
\tag{2}
$$

where $(mv^h_0, mv^h_0)$ is motion vector of the top-left corner control point, and $(mv^h_1, mv^h_1)$ is motion vector of the top-right corner control point and $(mv^h_2, mv_h^2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 13:
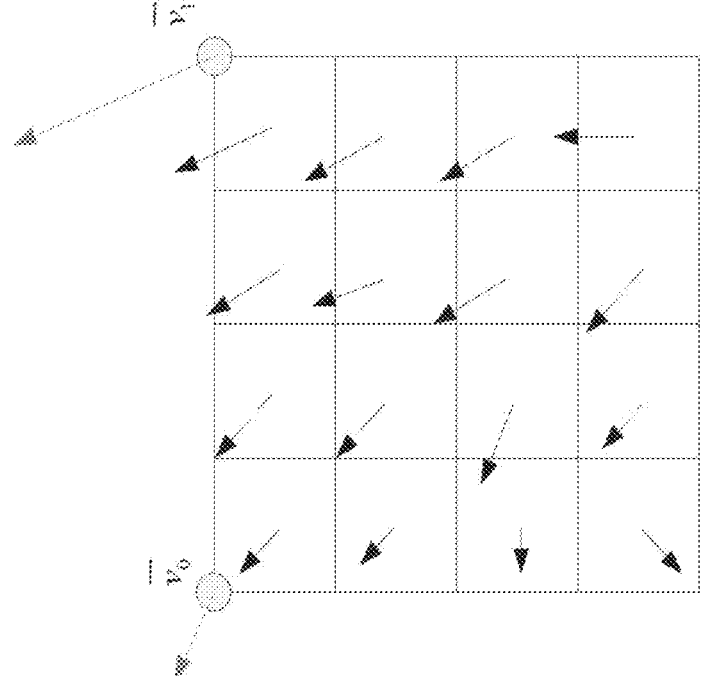
FIG. 13 shows an example of affine motion vector field per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 13, is calculated according to Equation (1) and (2), and rounded to ¹⁄₁₆ fraction accuracy. Then the motion compensation interpolation filters for ¹⁄₁₆-pel are applied to generate the prediction of each sub-block with derived motion vector. The interpolation filters for ¹⁄₁₆-pel are introduced by the affine mode.

After MCP, the high accuracy motion vector of each sub-block is rounded and saved as the same accuracy as the normal motion vector.

2.3.3.1 Signaling of Affine Prediction

Similar to the translational motion model, there are also two modes for signaling the side information due affine prediction. They are AFFINE_INTER and AFFINE_MERGE modes.

2.3.3.2 AF_INTER Mode

For CUs with both width and height larger than 8, AF_INTER mode can be applied. An affine flag in CU level is signalled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 14 or FIG. 16) and the estimated CPMVs are signalled. In addition, the index of affine AMVP candidate from which the estimated CPMVs are derived is further signalled.

1) Inherited Affine Motion Predictors

Figure 15:
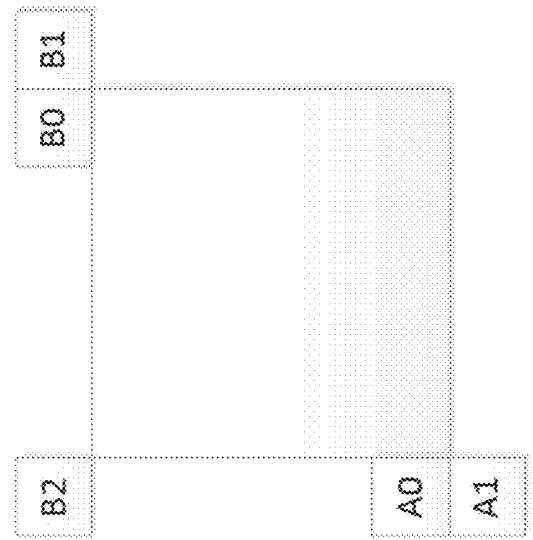
FIG. 15 shows an example of motion vector predictor for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 15.

Figure 17A:
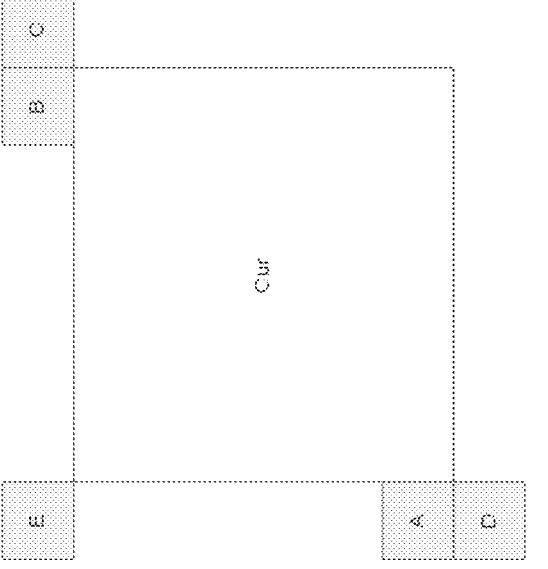
FIG. 17A shows an example of five neighboring block candidates for AF_MERGE and FIG. 17B shows an example of control point motion vector (CPMV) predictor derivation.
Figure 17B:
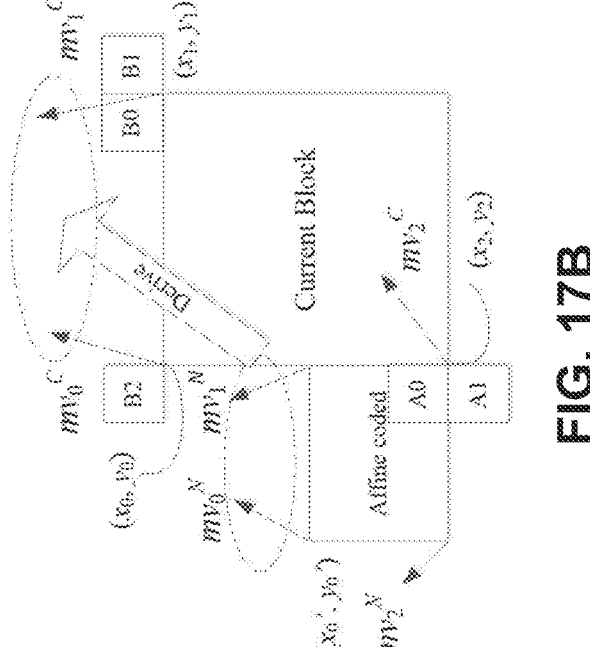

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $$MV_0^N$$

for the top-left CPMV and $$MV_1^N$$

for the top-right CPMV in FIG. 17B are utilized to derive the estimated CPMVs of current block, denoted by $$MV_0^C, MV_1^C, MV_2^C$$

for the top-left (with coordinate (x0, y0)), top-right (with coordinate (x1, y1)) and bottom-right positions (with coordinate (x2, y2)) of current block.

2) Constructed Affine Motion Predictors

Figure 16:
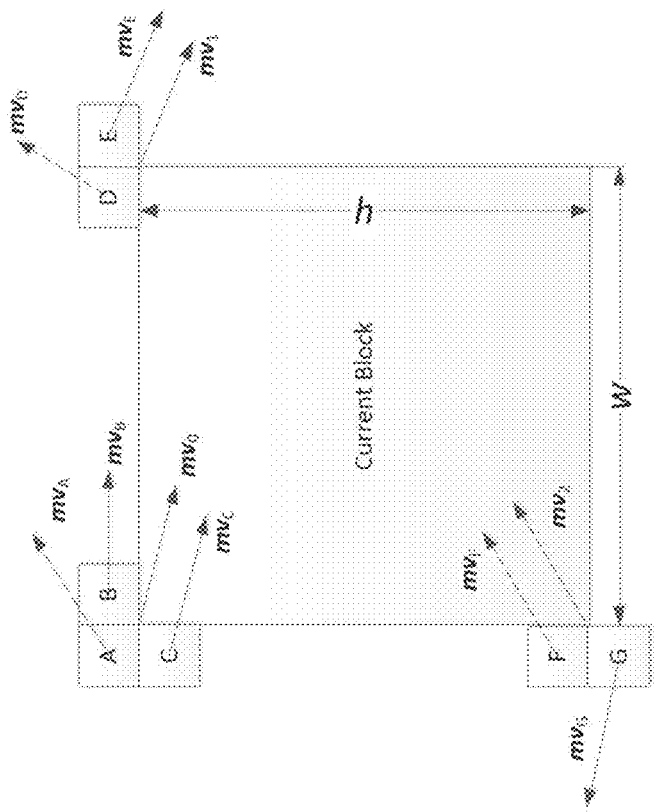
FIG. 16 shows an example of motion vector predictor for AF_INTER for constructed affine candidates.

A constructed affine motion predictor consists of control-point motion vectors (CPMVs) that are derived from neighboring inter coded blocks, as shown in FIG. 16, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$, is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.

2) Derive an affine motion predictor by setting all CPMVs equal to $\overline{mv}_1$ if available.

3) Derive an affine motion predictor by setting all CPMVs equal to $\overline{mv}_0$ if available.

4) Derive an affine motion predictor by setting all CPMVs equal to HEVC TMVP if available.

5) Derive an affine motion predictor by setting all CPMVs to zero MV.

Note that $\overline{mv}_1$ is already derived in constructed affine motion predictor.

In AF_INTER mode, when ⅙-parameter affine mode is used, ⅔ control points are required, and therefore ⅔ MVD needs to be coded for these control points, as shown in FIG. 14A-14B. In some embodiments, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 14B. Please note that the addition of two motion vectors (e.g., mvA (xA, yA) and mvB (xB, yB)) is equal to summation of two components separately, that is, newMV=mvA+mvB and the two components of newMV is set to (xA+xB) and (yA+yB), respectively.

2.3.3.3 AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 17A (denoted by A, B, C, D, E in order). For example, if the neighbour left bottom block is coded in affine mode as denoted by AO in FIG. 17B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU $mv_0^C$, $mv_1^C$ and $mv_2^C$ are derived, according to the simplified affine motion model Equation (1) and (2), the MVF of the current CU is generated. In order to identify whether the current CU is coded with AF_MERGE mode, an affine flag is signalled in the bitstream when there is at least one neighbour block is coded in affine mode.

In some embodiments, an affine merge candidate list is constructed with following steps:

Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

Insert Constructed Affine Candidates

Figure 18:
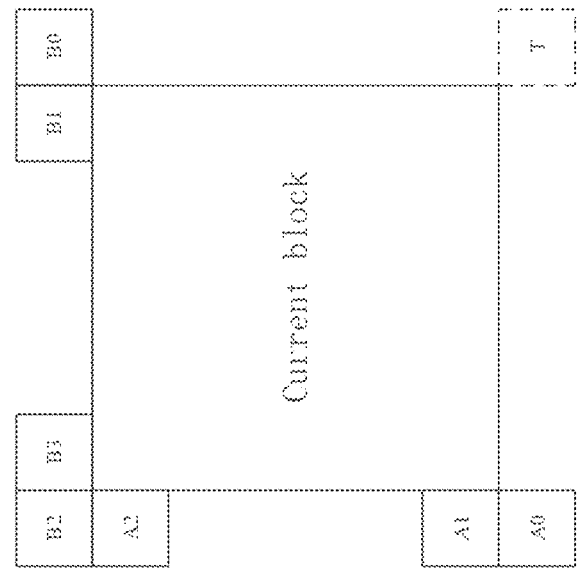
FIG. 18 shows examples of candidates position for affine merge mode.

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.

a) The motion information for the control points is derived firstly from the specified spatial neighbors and temporal neighbor shown in FIG. 18. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2->B3->A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1->B0.

For CP3, the checking priority is A1->A0.

For CP4, T is used.

b) Secondly, the combinations of controls points are used to construct an affine merge candidate.

I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

II. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

III. The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3} i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding With Zero Motion Vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

2.3.3.4 Sub-Block Sizes for Chroma Affine Coded Blocks

In some embodiments, the chroma sub-block size is modified from 2×2 to 4×4.

The MV of a 4×4 chroma sub-block is calculated as the average of the MVs of the four corresponding 4×4 luma sub-blocks. With the expanded sub-block size, the bandwidth in the worst case is reduced.

$$MV\_Chroma = Average\ (clipped(MV\_luma0) +$$
$$clipped(MV\_luma1) + clipped(MV\_luma2) + clipped(MV\_luma3))$$

2.3.4 Merge With Motion Vector Differences (MMVD)

In some embodiments, ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

Figure 19:
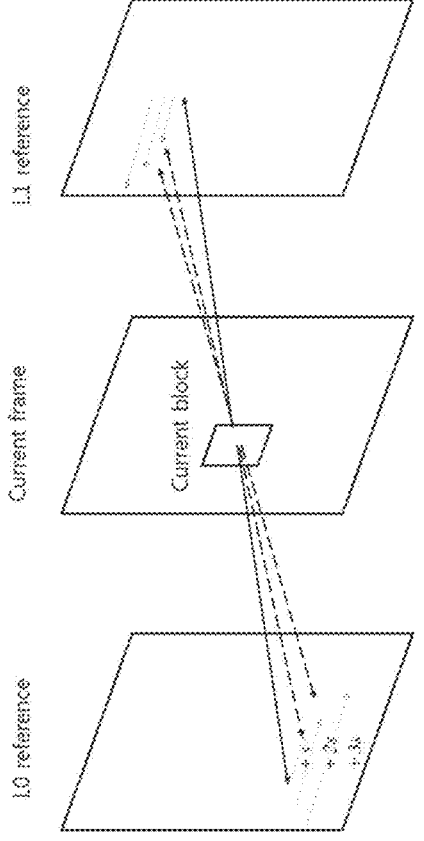
FIG. 19 illustrates an example of Ultimate Motion Vector Expression (UMVE) search process.
Figure 20:
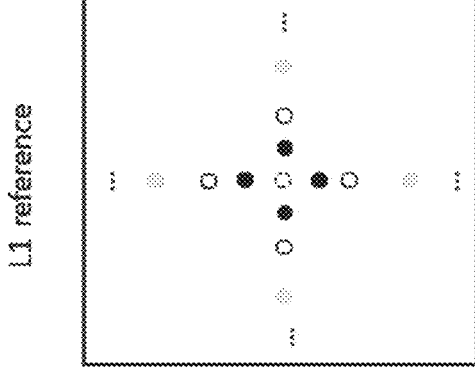
FIG. 20 illustrates an example of an UMVE search point.

FIG. 19 and FIG. 20 show examples of UMVE search process and a search point.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| | Base candidate IDX | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, base candidate IDX is not signaled.

Distance index is motion magnitude information. Distance index indicates the pre-defined distance from the starting point information. Pre-defined distance is as follows:

TABLE 2

| | Distance IDX | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| | Direction IDX | | | |
|---|---|---|---|---|
| Direction IDX | 00 | 01 | 10 | 11 |
| x-axis | + | − | N/A | N/A |
| y-axis | N/A | N/A | + | − |

UMVE flag is singnaled right after sending a skip flag or merge flag. If skip or merge flag is true, UMVE flag is parsed. If UMVE flage is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

2.3.5 Decoder-Side Motion Vector Refinement (DMVR)

In bi-prediction operation, for the prediction of one block region, two prediction blocks, formed using a motion vector (MV) of list 0 and a MV of list 1, respectively, are combined to form a single prediction signal. In the decoder-side motion vector refinement (DMVR) method, the two motion vectors of the bi-prediction are further refined.

Figure 21:
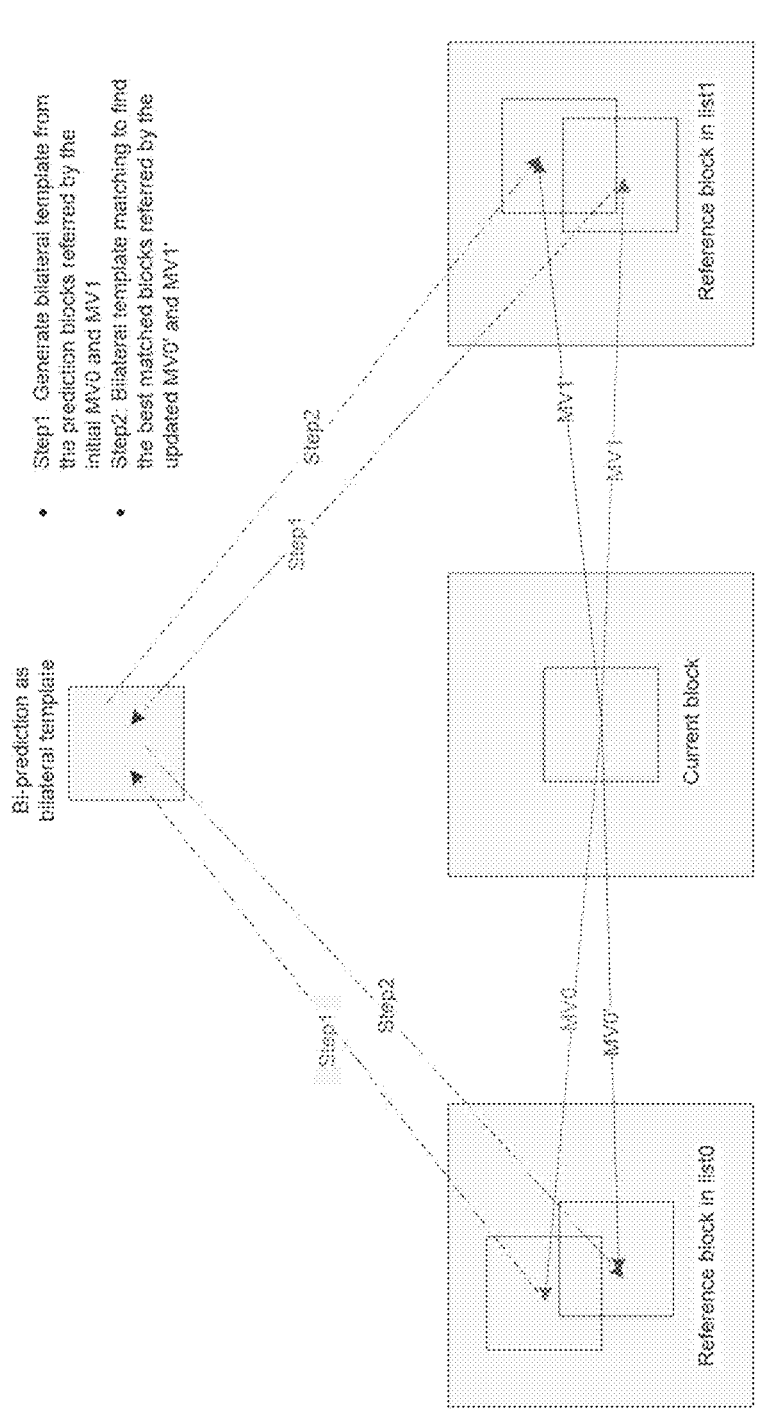
FIG. 21 shows an example of decoder side motion vector refinement (DMVR) based on bilateral template matching.

In JEM design, the motion vectors are refined by a bilateral template matching process. The bilateral template matching applied in the decoder to perform a distortion-based search between a bilateral template and the reconstruction samples in the reference pictures in order to obtain a refined MV without transmission of additional motion information. An example is depicted in FIG. 21. The bilateral template is generated as the weighted combination (i.e. average) of the two prediction blocks, from the initial MV0 of list 0 and MV1 of list 1, respectively, as shown in FIG. 21. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both.

Finally, the two new MVs, i.e., MV0' and MV1' as shown in FIG. 21, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

To further simplify the process of DMVR, several changes to the design are proposed. More specifically, the adopted DMVR design to VTM-4.0 has the following main features:

Early termination w/(0,0) position SAD between list 0 and list 1

Block sizes for DMVR W*H>=64 && H>=8

Split the CU into multiple of 16×16 sub-blocks for DMVR of CU size>16*16

Reference block size (W+7)*(H+7) (for luma)

25 points SAD-based integer-pel search (i.e. (+−) 2 refinement search range, single stage)

Bilinear-interpolation based DMVR

MVD mirroring between list 0 and list 1 to allow bilateral matching

"Parametric error surface equation" based sub-pel refinement

Luma/chroma MC w/reference block padding (if needed).

Refined MVs used for MC and TMVPs only 2.4 In-Loop Reshaper (ILR)

The basic idea of in-loop reshaper (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT[$Y_i$]. The other LUT is an inverse LUT, InvLUT, that maps altered code values $Y_r$ to $\hat{Y}_i$: $\hat{Y}_i$=InvLUT[$Y_r$]. ($\hat{Y}_i$ represents the reconstruction values of $Y_i$).

2.4.1 PWL Model

Conceptually, piece-wise linear (PWL) model is implemented in the following way:

Let x1, x2 be two input pivot points, and y1, y2 be their corresponding output pivot points for one piece. The output value y for any input value x between x1 and x2 can be interpolated by the following equation:

$$y = \left((Y2 - y1)/(x2 - x1)\right) * (x - x1) + y1$$

In fixed point implementation, the equation can be rewritten as:

$$y = \left((m * x + 2^{FP\_PREC-1}) >> FP\_PREC\right) + c$$

where m is scalar, c is an offset, and FP_PREC is a constant value to specify the precision.

Note that in CE-12 software, the PWL model is used to precompute the 1024-entry FwdLUT and InvLUT mapping tables; but the PWL model also allows implementations to calculate identical mapping values on-the-fly without precomputing the LUTs.

2.4.2 Test CE12-2

2.4.2.1 Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 22:
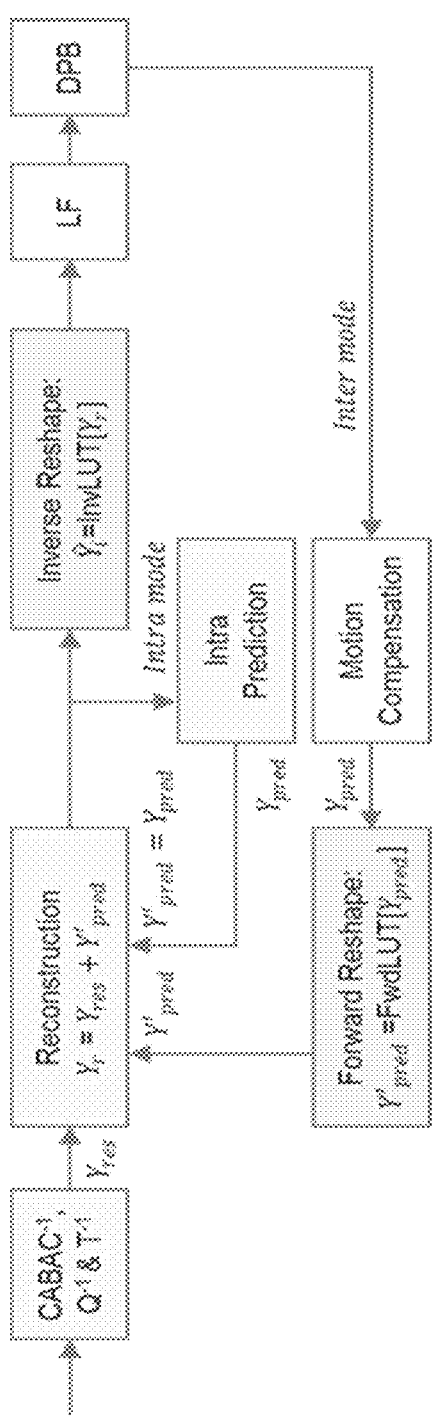
FIG. 22 shows an example process for luma sample reshaping.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 22 shows the block diagram of the CE12-2 decoding process based on mode.

CE12-2 also tests 16-piece piece-wise linear (PWL) models for luma and chroma residue scaling instead of the 32-piece PWL models of CE12-1.

Inter slice reconstruction with in-loop luma reshaper in CE12-2 (light-green shaded blocks indicate signal in reshaped domain: luma residue; intra luma predicted; and intra luma reconstructed)

2.4.2.2 Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra the reconstructed luma is averaged.

For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values 2.4.2.3 Signalling of ILR Side Information The parameters are (currently) sent in the tile group header (similar to ALF). These reportedly take 40-100 bits.

2.5 Quantization

Quantization consists of division by a quantization step size (Qstep) and subsequent rounding while inverse quantization consists of multiplication by the quantization step size. Here, Qstep refers to the equivalent step size for an orthonormal transform. Similar to H.264/AVC, a quantization parameter (QP) is used to determine the quantization step size in HEVC. QP can take 52 values from 0 to 51 for 8-bit video sequences. An increase of 1 in QP means an increase of the quantization step size by approximately 12% (i.e., $2^{1/6}$). An increase of 6 leads to an increase in the quantization step size by a factor of 2. In addition to specifying the relative difference between the step-sizes of two consecutive QP values, there is also a need to define the absolute step-size associated with the range of QP values. This was done by selecting Qstep=1for QP=4.

In H.264/HEVC/VVC, the dead-zone quantization method is utilized. The dead-zone quantizer utilizes a rounding offset for quantization, and the classification region around the zero output value of such a quantizer is referred to as the dead zone. The dead zone can sometimes serve the same purpose as a noise gate or squelch function. Especially for compression applications, the dead-zone may be given a different width than that for the other steps. For an otherwise-uniform quantizer, the dead-zone width can be set to any value w by using the forward quantization rule.

$$k = \mathrm{sgn}(x) * \max\left(0, \left\lfloor \frac{|x| - \frac{w}{2}}{\Delta} + 1 \right\rfloor\right),$$

where the function sgn ( ) is the sign function (also known as the signum function). The general reconstruction rule for such a dead-zone quantizer is given by $$y_k = \mathrm{sgn}(k) * \left(\frac{w}{2} + \Delta * (|k| - 1 + r_k)\right).$$

where $r_k$ is a reconstruction offset value in the range of 0 to 1 as a fraction of the step size. Ordinarily, $0 <= r_k <= \frac{1}{2}$ when quantizing input data with a typical pdf that is symmetric around zero and reaches its peak value at zero (such as a Gaussian, Laplacian, or Generalized Gaussian pdf). Although $r_k$ may depend on k in general, and can be chosen to fulfill the optimality condition described below, it is often simply set to a constant, such as $\frac{1}{2}$. (Note that in this definition, $y_0 = 0$ due to the definition of the sgn( ) function, so $r_0$ has no effect).

In the standard, the above process is implemented with multiplications (based on scaling factors for different quantization parameters (QPs) which controls $\Delta$) and shifts.

3. Examples of Problems Solved by Embodiments

According to the design of ILR, it is observed that different picture may contain different characteristics, and the range of available luma samples may be different. Therefore, using the same quantization method (same quantization step and offset if QP is the same) is not very efficient.

4. Example Embodiments

The listing of example techniques and embodiments below should be considered as examples to explain general concepts. These embodiments should not be interpreted in a narrow way. Furthermore, these embodiments can be combined in any suitable manner.

1. It is proposed to define two-level quantization parameters (QPs), wherein the two-level has different step sizes.
    a. In one example, the first level quantization parameters may be set in conventional ways (such as with quantization step depending on $2^{qp/6}$).
    b. In one example, the second level quantization parameters may be set in conventional ways.
        i. The first level quantizer may be a fine quantizer, and the quantization step of the first level may be smaller than that of the second level.
        ii. The first level quantizer may be a piece-wise linear function.
        iii. The first level quantizer may depend on the quantization parameter of the second quantizer.
        iv. The first level quantizer may depend on the output value, i.e., dequantized value, of the second quantizer.
        v. Whether the first level quantizer is enabled or not may depend on the quantization parameter of the second quantizer.
            1. For example, the first level quantizer is disabled if quantization parameter of the second quantizer is larger than or equal to a threshold X.

2. For example, the first level quantizer is disabled if quantization parameter of the second quantizer is smaller than or equal to a threshold X.

vi. Whether the first level quantizer is enabled or not may depend on the number (or the ratio) of the non-zero coefficients.

1. In one example, if the number of the non-zero coefficients is smaller than or equal to Th*W*H (W and H are the width and height of the block/CU/PU/TU), the first level quantizer is disabled.

2. In one example, if the number of the non-zero coefficients is greater than or equal to Th*W*H, the first level quantizer is disabled.

vii. The first level quantizer may be applied only to some coefficients.

1. In one example, the first level quantizer may be applied to high frequency coefficients.

2. In one example, the first level quantizer may be applied to low frequency coefficients.

3. In one example, the first level quantizer may be applied to some predefined frequency coefficients.

c. In one example, the second level quantization parameters may define the refined step size for a given first level quantization parameter.

i. In one example, how to apply the second level quantization may depend on the first quantization parameters. For example, the step size or the reconstruction level of the second level quantization may depend on the first level quantization.

d. When this method is applied, the final quantization step and/or rounding offset may depend on both the first and second level quantization parameters.

e. When this method is applied, the final reconstructed coefficient may depend on both the first and second level quantization parameters.

f. In one example, the first level or/and second level QP may be signalled/derived once for the whole picture/tile group/tile/CTU row/a region/a color component.

i. In one example, whether to and/or how to signal the first level or/and second level QP may depend on the first level quantization.

g. Alternatively, furthermore, the signalling of delta QPs may be done in two steps, one for the delta QP in the first level and the other one for the delta QP in the second level.

2. It is proposed to signal finer step sizes and/or rounding offset such that the same block under same quantization parameter (QP) may result in different quantization and/or the same residual block under same quantization parameter (QP) may result in different dequantization results.

a. In one example, such information may be signalled in high level other than in block-level.

i. In one example, it may be signalled in picture header. In this case, the semantics of same QP values may be changed from picture to picture.

ii. In one example, it may be signalled in tile header. In this case, the semantics of same QP values may be changed from tile group to tile group.

iii. In one example, it may be signalled in tile header. In this case, the semantics of same QP values may be changed from tile to tile.

b. In one example, such method may be applied to certain color component (such as chroma component).

3. Different step size and/or rounding offset may be utilized for different coefficient positions within one block.

a. In one example, the step size and/or rounding offset may depend on the block dimension, and/or block shape (e.g., square or rectangular).

b. In one example, the step size and/or rounding offset may depend on the coefficient scanning order.

c. In one example, the step size and/or rounding offset may depend on whether transform/inverse transform is used.

d. In one example, the step size and/or rounding offset may depend on which transform/inverse transform is used.

e. In one example, the step size and/or rounding offset may depend on the coding information, such as inter-coded or intra-coded.

f. In one example, the step size and/or offset may depend on the quantization parameter (QP) signaled in conventional ways (such as in block-level/CTU-level) and the other one signaled in higher level (such as in picture/tile group header).

4. The above proposed method may be applied under certain conditions, such as block sizes, slice/picture/tile types, or motion information.

a. In one example, when a block size contains smaller than M*H samples, e.g., 16 or 32 or 64 luma samples, proposed method is not allowed.

b. Alternatively, when minimum size of a block's width or/and height is smaller than or no larger than X, proposed method is not allowed. In one example, X is set to 8.

c. Alternatively, when minimum size of a block's width or/and height is no smaller than X, proposed method is not allowed. In one example, X is set to 8.

d. Alternatively, when a block's width>th1 or >=th1 and/or a block's height>th2 or >=th2, proposed method is not allowed. In one example, th1 and/or th2 is set to 8.

e. Alternatively, when a block's width<th1 or <=th1 and/or a block's height<th2 or <a=th2, proposed method is not allowed. In one example, th1 and/or th2 is set to 8.

5. Whether to enable or disable the above methods may be signaled in sequence parameter set (SPS)/picture parameter set (PPS)/adaptation parameter set (APS)/video parameter set (VPS)/sequence header/picture header/slice header/tile group header/tile/group of CTUs, etc. al.

a. Alternatively, which method to be used may be signaled in SPS/PPS/VPS/sequence header/picture header/slice header/tile group header/tile/group of CTUs, etc. al.

b. Alternatively, whether to enable or disable the above methods and/or which method to be applied may be dependent on block dimension, Virtual Pipelining Data Units (VPDU), picture type, low delay check flag, coded information of current block (such as reference pictures, uni or bi-prediction) or previously coded blocks.

Figure 23:
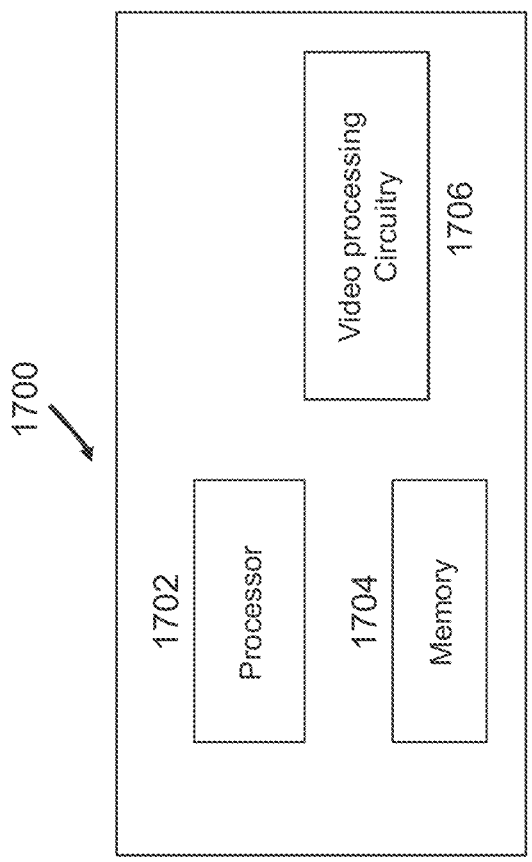
FIG. 23 is a block diagram of an example of a video processing apparatus.

FIG. 23 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods described in the present disclosure. The memory (memories) 1704 may be used for storing data and code used for implementing the methods and techniques described herein. The video processing hardware 1706 may be used to implement, in hardware circuitry, some techniques described in the present disclosure.

Figure 24:
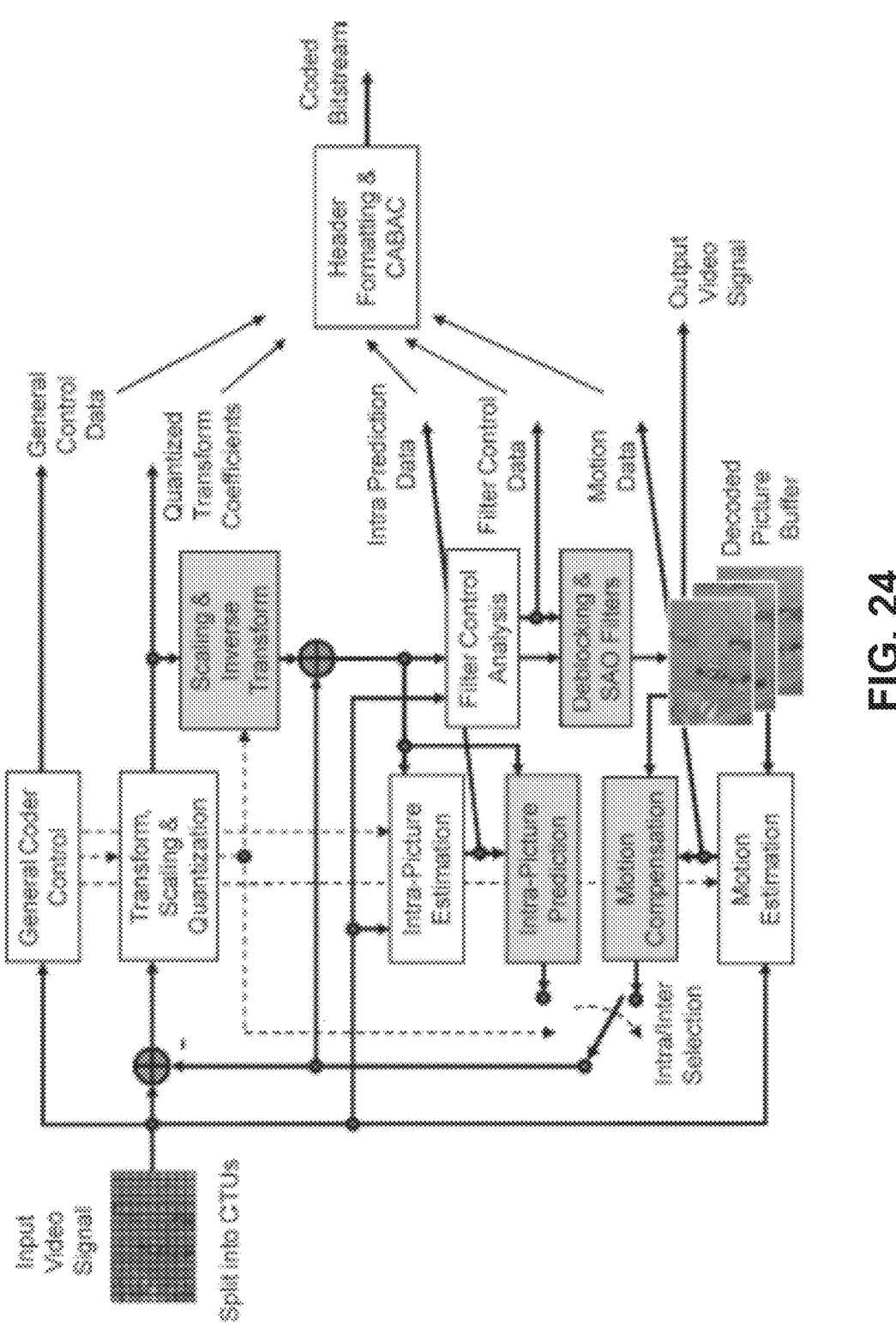
FIG. 24 shows a block diagram of an example implementation of a video encoder.

FIG. 24 is a block diagram for an example implementation of a video encoder in which video decoding feedback loop is used for encoding video frames or pictures.

Figure 25:
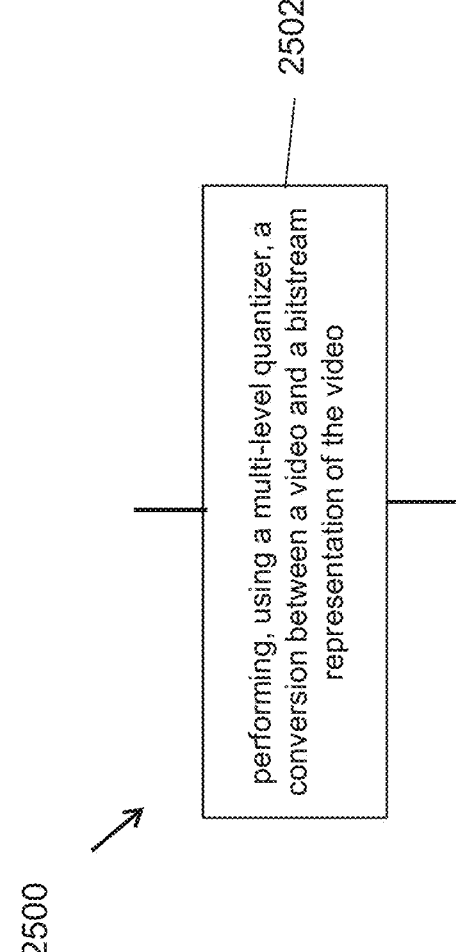
FIG. 25 is a flowchart for an example of a video processing method.

FIG. 25 is a flowchart for an example method 2500 of video processing. The method 2500 includes performing (2502), using a multi-level quantizer, a conversion between a video and a bitstream representation of the video. The multi-level quantizer includes at least a first level quantization that uses a first quantization precision and/or a second level quantization that uses a second quantization precision different from the first quantization precision. The first level quantization and the second level quantization are selectively enabled for a current video block depends on a multi-level quantization rule.

Figure 26:
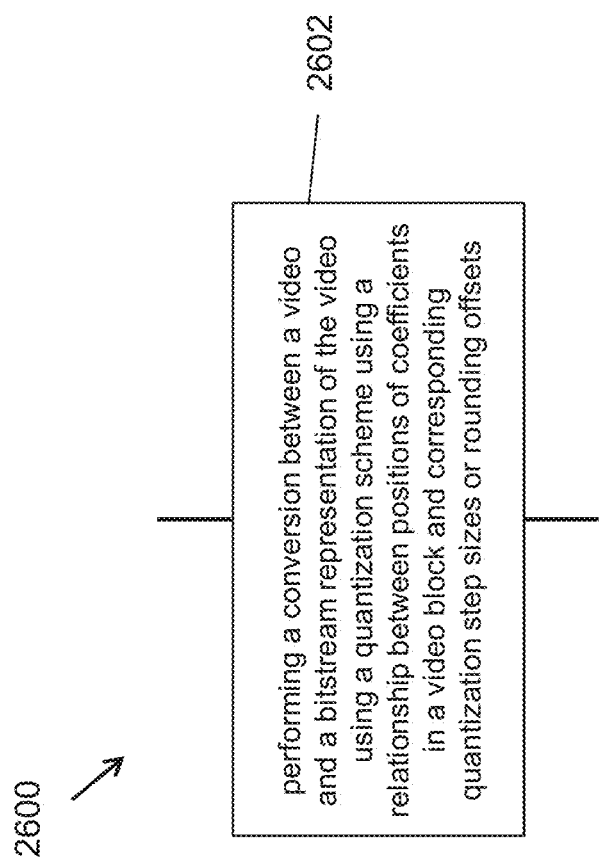
FIG. 26 is a flowchart for an example of a video processing method.

FIG. 26 is a flowchart for an example method 2600 of video processing. The method 2600 includes performing (2602) a conversion between a video and a bitstream representation of the video using a quantization scheme using a relationship between positions of coefficients in a video block and corresponding quantization step sizes or rounding offsets.

FIG. 27 is a flowchart for an example method 2700 of video processing. The method 2700 includes determining (2702), during a conversion between a current video block and a bitstream representation of a video including the current video block, two-level quantization parameters comprising a first level quantization parameter QP1 and a second level quantization parameter QP2 for the current video block; and performing (2704), at least based on the two-level quantization parameters, a first level quantization and/or a second level quantization during the conversion, wherein the two-level quantization parameters correspond to different quantization precisions respectively.

Figure 28:
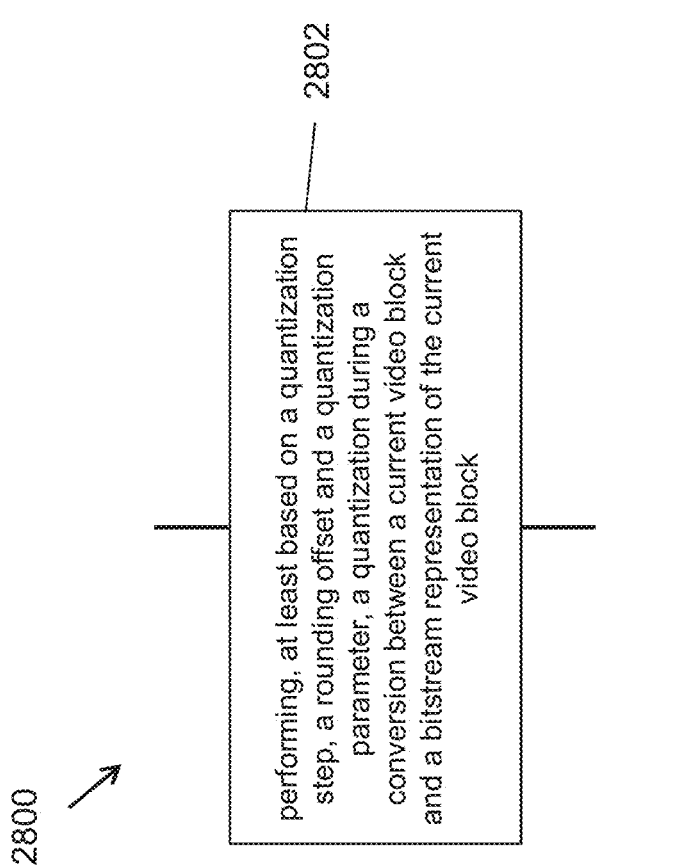
FIG. 28 is a flowchart for an example of a video processing method.

FIG. 28 is a flowchart for an example method 2700 of video processing. The method 2800 includes performing (2802), at least based on a quantization step, a rounding offset and a quantization parameter, a quantization during a conversion between a current video block and a bitstream representation of the current video block, wherein the quantization step is smaller than 21/6, and the quantization step and/or the rounding offset for the current video block is signaled in the bitstream representation.

In the methods 2500 to 2800, the conversion may include video encoding in which the bitstream representation is generated from the video or video decoding in which the video is generated from the bitstream representation.

Various embodiments and additional features of these methods can be described using the following clause-based recitation.

1. A method of video processing, comprising: performing, using a multi-level quantizer, a conversion between a video and a bitstream representation of the video; wherein the multi-level quantizer includes at least a first level quantization that uses a first quantization precision and/or a second level quantization that uses a second quantization precision different from the first quantization precision; and wherein the first level quantization and the second level quantization are selectively enabled for a current video block depends on a multi-level quantization (MLQ) rule.

For example, the multi-level quantizer may use the refinement approach disclosed in the present disclosure. Various examples of the MLQ rule are also described in the listing in Section 4 of the present disclosure.

2. The method of clause 1, wherein the first quantization precision is based on a first quantization parameter that determines a first step size.

3. The method of clauses 1-2, wherein the second quantization precision is based on a second quantization parameter that determines a second step size.

4. The method of clause 2, wherein the first level quantization parameters (QP1) are related to the first step size using a power-of-two relationship.

5. The method of any of clauses 2-4, wherein the first step size is equal to $2^{QP1-K0/6}$ wherein K0=4.

6. The method of any of clauses 2-4, wherein the second level quantization parameters (QP2) are related to the second step size using a power-of-N relationship (N is an integer, for example, N=2).

7. The method of any of clauses 2-6, wherein the second step size is unequal to $2^{L-K0/6}$ wherein L is any quantization parameter in the first level quantization parameter.

8. The method of any of clauses 2-7, wherein the first quantization step is smaller than the second quantization step.

9. The method of any of clauses 1-8, wherein the MLQ rule specifies enabling the first level quantization for the current video block based on a value of the second quantization parameter.

10. The method of any of clauses 1-8, wherein the MLQ rule specifies enabling the first level quantization for the current video block based on a number or ratio of non-zero coefficients in the current video block.

11. The method of any of clauses 1-10, wherein the MLQ rule specifies enabling the first level quantizer only to a subset of all coefficients of the current video block.

12. The method of clause 9, wherein the subset includes high frequency coefficients of the current video block that have frequencies above a threshold.

13. The method of clause 12, wherein the subset includes low frequency coefficients of the current video block that have frequencies below a threshold.

14. The method of clause 1, wherein the first level quantization uses a first piecewise linear function.

15. The method of clauses 1 or 14, wherein the second level quantization uses a second piecewise linear function.

16. The method of any of clauses 1 to 15, wherein the first quantization precision or the second quantization precision are signaled in a field in the bitstream representation.

17. The method of clause 16, wherein the field is included in the bitstream representation at a picture header or a tile header level.

18. The method of any of clauses 1 to 17, wherein the current video block comprises a color component of the video.

19. A method of video processing, comprising: performing a conversion between a video and a bitstream representation of the video using a quantization scheme using a relationship between positions of coefficients in a video block and corresponding quantization step sizes or rounding offsets.

20. The method of clause 19, wherein the relationship is a function of a dimension or a shape of the video block.

21. The method of any of clauses 19-20, wherein the relationship is a function of a scanning order of the coefficients in the video block.

22. The method of any of clauses 19-21, wherein the relationship is a function of intra or inter coding mode of the video block.

23. The method of any of clauses 19-22, wherein step sizes or rounding offsets depend on quantization parameters for the current video block.

24. The method of any of clauses 19-23, wherein the relationship is enabled under a coding condition for the current video block.

25. The method of clause 24, wherein the coding condition includes a size of the current video block.

26. The method of any of clauses 19-25, wherein the relationship is indicated at a slice, picture, an adaptation parameter set level, a video parameter set level adaptation parameter set level, a sequence header, a picture header, a slice header, a tile group header, a tile or a group of coding tree units.

27. The method of any of clauses 1-26, wherein the conversion comprises generating the current video block from the bitstream representation or generating the bitstream representation from the current video block.

28. A video decoding apparatus comprising a processor configured to implement a method recited in one or more of clauses 1 to 27.

29. A video encoding apparatus comprising a processor configured to implement a method recited in one or more of clauses 1 to 27.

30. A computer-readable program medium having code stored thereupon, the code comprising instructions that, when executed by a processor, causing the processor to implement a method recited in one or more of clauses 1 to 27.

Various other embodiments and additional features of these methods can be described using the following clause-based recitation.

1. A method for video processing, comprising:

determining, during a conversion between a current video block and a bitstream representation of a video including the current video block, two-level quantization parameters comprising a first level quantization parameter QPI and a second level quantization parameter QP2 for the current video block; and performing, at least based on the two-level quantization parameters, a first level quantization and/or a second level quantization during the conversion, wherein the two-level quantization parameters correspond to different quantization precisions respectively.

2. The method of clause 1, wherein the first level quantization parameter QPI corresponds to a first quantization step QS1 with a relationship of $QS1=2^{QP1/N}$, wherein N is an integer bigger than 1.

3. The method of clause 1 or clause 2, wherein the second level quantization parameter QP2 corresponds to a second quantization step QS2 with a relationship of $QS2=2^{QP2/M}$, wherein M is a integer bigger than 1, and N is different from M.

4. The method of clause 3, wherein the first quantization step QS1 is smaller than the second quantization step QS2.

5. The method of anyone of clauses 1-4, wherein the first level quantization uses a piece-wise linear function with the first level quantization parameter QP1 as a variable.

6. The method of anyone of clauses 1-5, wherein the first level quantization depends on the second level quantization parameter QP2.

7. The method of anyone of clauses 1-6, wherein the first level quantization depends on a result of the second level quantization.

8. The method of anyone of clauses 1-7, wherein the first level quantization is enabled according to the second level quantization parameter QP2.

9. The method of clause 8, wherein the first level quantization is disabled in response to the second level quantization parameter QP2 being larger than or equal to a first predetermined threshold.

10. The method of clause 8, wherein the first level quantization is disabled in response to the second level quantization parameter QP2 being smaller than or equal to a first predetermined threshold.

11. The method of anyone of clauses 1-10, wherein the first level quantization is enabled according to a number or a ratio of non-zero coefficients in the current video block.

12. The method of clause 11, wherein the first level quantization is disabled in response to the number of the non-zero coefficients is smaller than or equal to a second predetermined threshold.

13. The method of clause 11, wherein the first level quantization is disabled in response to the number of the non-zero coefficients is greater than or equal to a second predetermined threshold.

14. The method of clause 12 or 13, wherein the second predetermined threshold is Th×W×H, W and H are the width and height of the current video block respectively, and Th is a variable no smaller than 0.

15. The method of anyone of clauses 1-14, wherein performing the first level quantization comprises: performing the first level quantization on a subset of coefficients of the current video block.

16. The method of clause 15, wherein the subset of coefficients of the current video block comprises one of the followings: a subset of coefficients with frequency higher than a first threshold frequency, a subset of coefficients with frequency lower than a second threshold frequency, and a subset of coefficients with a predefined frequency of the current video block.

17. The method of anyone of clauses 1-16, wherein the first quantization step QS1 corresponding to a given first level quantization parameter QPI is defined by the second level quantization parameter QP2.

18. The method of anyone of clauses 1-17, wherein performing the second level quantization comprises: performing the second level quantization according to the first level quantization parameter QP1.

19. The method of clause 18, wherein the second quantization step QS2 or a reconstruction level of the second level quantization depends on the first level quantization parameter QP1.

20. The method of anyone of clauses 1-19, wherein performing, at least based on the two-level quantization parameters, the first level quantization and/or the second level quantization during the conversion comprises: determining a rounding offset and performing quantization based on both the first level quantization parameter QPI and the second level quantization parameter QP2.

21. The method of anyone of clauses 1-20, wherein performing, at least based on the two-level quantization parameters, the first level quantization and/or the second level quantization during the conversion comprises:

obtaining a reconstructed coefficient based on both the first level quantization parameter QP1 and the second level quantization parameter QP2.

22. The method of anyone of clauses 1-21, wherein the first level quantization parameter QP1 and/or the second level quantization parameter QP2 are signalled once for a whole picture, a tile group, a tile, a coding tree unit row, a region and/or a color component.

23. The method of clause 22, wherein the first level quantization parameter QP1 and/or the second level quantization parameter QP2 are signalled according to the first level quantization.

24. The method of anyone of clauses 1-21, wherein a first delta quantization parameter for the first level quantization is signalled and then a second delta quantization parameter for the second level quantization is signalled.

25. A method for video processing, comprising:

performing, at least based on a quantization step, a rounding offset and a quantization parameter, a quantization during a conversion between a current video block and a bitstream representation of the current video block, wherein the quantization step is smaller than $2^{1/6}$, and the quantization step and/or the rounding offset for the current video block is signaled in the bitstream representation.

26. The method of clause 25, wherein the quantization step and/or a rounding offset are signaled in a video region level wherein the video region is larger than a coding block.

27. The method of clause 26, wherein the video region is a picture or tile and the quantization step and/or a rounding offset are signaled in a picture header or in a tile header.

28. The method of anyone of clauses 25-27, wherein performing, at least based on the quantization step, the rounding offset and a quantization parameter, a quantization during the conversion comprises:

performing the quantization for a certain color component of the current video block.

29. The method of anyone of clauses 25-28, wherein the quantization step and/or the rounding offset for the current video block is signaled according to coefficient position in the current video block.

30. The method of anyone of clauses 25-29, wherein the quantization step and/or the rounding offset for the current video block is signaled according to a block dimension and/or a block shape of the current video block.

31. The method of anyone of clauses 25-30, wherein the quantization step and/or the rounding offset for the current video block is signaled according to a coefficient scanning order of the current video block.

32. The method of anyone of clauses 25-31, wherein the quantization step and/or a rounding offset for the current video block is signaled according to whether and/or which transform or inverse transform is used.

33. The method of anyone of clauses 25-32, wherein the quantization step and/or the rounding offset for the current video block is signaled according to a coding mode of the current video block.

34. The method of anyone of clauses 25-33, wherein the quantization step and/or the rounding offset for the current video block is signaled according to the quantization parameter of the current video block signaled in a block level, a coding tree unit level, a tile group header level or a picture level.

35. The method of anyone of clauses 25-34, wherein the quantization step and/or a rounding offset for the current video block is signaled in response to a predefined condition being satisfied.

36. The method of clause 35, wherein the predefined condition is satisfied when the current video block contains a number of luma samples and the number is not smaller than a predefined number threshold.

37. The method of clause 35, wherein the predefined condition is satisfied when a minimum size of a width and/or a height of the current video block is larger than a predefined size threshold.

38. The method of clause 35, wherein the predefined condition is satisfied when a minimum size of a width and/or a height of the current video block is smaller than a predefined size threshold.

39. The method of clause 35, wherein the predefined condition is satisfied when a width of the current video block is smaller than a predefined width threshold and/or a height of the current video block is smaller than a predefined height threshold.

40. The method of clause 35, wherein the predefined condition is satisfied when a width of the current video block is larger than a predefined width threshold and/or a height of the current video block is larger than a predefined height threshold.

41. The method of anyone of clauses 25-40, wherein the quantization step and/or the rounding offset for the current video block is signaled according to enable information signaled in SPS, PPS, APS, VPS, a sequence header, a picture header, a slice header, a tile group header, a tile, a group of coding tree unit.

42. The method of clause 41, wherein the enable information depends on a block dimension, Virtual Pipelining Data Units (VPDU), a picture type, a low delay check flag, coded information of current video block or previously coded video blocks.

43. A video processing apparatus comprising a processor configured to implement a method recited in anyone of clauses 1 to 42.

44. The apparatus of clause 43, wherein the apparatus is a video encoder.

45. The apparatus of clause 43, wherein the apparatus is a video decoder.

46. A computer readable recoding media on which a program comprising code is recorded, the program is for a processor to carry out a method recited in anyone of clauses 1 to 42.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

The invention claimed is:

1. A method for video processing, comprising:

determining, during a conversion between a current video block and a bitstream representation of a video including the current video block, a quantization step, a rounding offset, and a quantization parameter; and performing, at least based on the quantization step, the rounding offset, and the quantization parameter, a quantization during the conversion, wherein the quantization step and/or the rounding offset for the current video block is signaled according to a coefficient position in the current video block, wherein the quantization parameter comprises a first level quantization parameter QP1 and a second level quantization parameter QP2, and the quantization includes a first level quantization corresponding to the first level quantization parameter QP1 and a second level quantization corresponding to the second level quantization parameter QP2, and wherein a first quantization step QS1 corresponding to the first level quantization parameter QP1 is defined by the second level quantization parameter QP2.

2. The method of claim 1, wherein the quantization step and/or the rounding offset for the current video block is signaled according to at least one of (i) a block dimension and/or a block shape of the current video block, (ii) a coefficient scanning order of the current video block, (iii) whether transform or inverse transform is used, (iv) which transform or inverse transform is used, (v) a coding mode of the current video block, and (vi) the quantization parameter of the current video block signaled in a block level, a coding tree unit level, a tile group header level or a picture level.

3. The method of claim 1, wherein a second quantization step QS2 or a reconstruction level of the second level quantization depends on the first level quantization parameter QP1.

4. The method of claim 1, wherein the quantization step and/or the rounding offset for the current video block is signaled at a level of a video region, wherein the video region is larger than a coding block.

5. The method of claim 4, wherein the video region is a picture or a tile, and the quantization step and/or the rounding offset for the current video block is signaled in a picture header or in a tile header.

6. The method of claim 1, wherein the quantization is performed for a color component of the current video block.

7. The method of claim 1, wherein the quantization step and/or the rounding offset for the current video block is signaled in response to a predefined condition being satisfied.

8. The method of claim 7, wherein the predefined condition includes at least one of:

(i) the current video block contains a number of luma samples and the number being not smaller than a first predefined number threshold;

(ii) a minimum size of a width and/or a height of the current video block being larger than a second predefined size threshold;

(iii) the minimum size of the width and/or the height of the current video block being smaller than a third predefined size threshold;

(iv) the width of the current video block being smaller than a fourth predefined width threshold and/or the height of the current video block being smaller than a fifth predefined height threshold; and (v) the width of the current video block being larger than a sixth predefined width threshold and/or the height of the current video block being larger than a seventh predefined height threshold.

9. The method of claim 1, wherein the quantization step and/or the rounding offset for the current video block is signaled according to enable information signaled in a sequence parameter set (SPS), a picture parameter set (PPS), an adaptation parameter set (APS), a video parameter set (VPS), a sequence header, a picture header, a slice header, a tile group header, a tile, a group of coding tree unit.

10. The method of claim 9, wherein the enable information depends on a block dimension, Virtual Pipelining Data Units (VPDUs), a picture type, a low delay check flag, coded information of the current video block or previously coded video blocks.

11. The method of claim 1, wherein the conversion includes encoding the video into the bitstream representation.

12. The method of claim 1, wherein the conversion includes decoding the video from the bitstream representation.

13. An apparatus for processing video data comprising a processor and a non-transitory memory with instructions thereon, wherein the instructions upon execution by the processor, cause the processor to:

determine, during a conversion between a current video block and a bitstream representation of a video including the current video block, a quantization step, a rounding offset, and a quantization parameter; and perform, at least based on the quantization step, the rounding offset, and the quantization parameter, a quantization during the conversion, wherein the quantization step and/or the rounding offset for the current video block is signaled according to a coefficient position in the current video block, wherein the quantization parameter comprises a first level quantization parameter QP1 and a second level quantization parameter QP2, and the quantization includes a first level quantization corresponding to the first level quantization parameter QP1 and a second level quantization corresponding to the second level quantization parameter QP2, and wherein a first quantization step QS1 corresponding to the first level quantization parameter QP1 is defined by the second level quantization parameter QP2.

14. The apparatus of claim 13, wherein the quantization step and/or the rounding offset for the current video block is signaled according to at least one of (i) a block dimension and/or a block shape of the current video block, (ii) a coefficient scanning order of the current video block, (iii) whether transform or inverse transform is used, (iv) which transform or inverse transform is used, (v) a coding mode of the current video block, and (vi) the quantization parameter of the current video block signaled in a block level, a coding tree unit level, a tile group header level or a picture level.

15. The apparatus of claim 13, wherein a second quantization step QS2 or a reconstruction level of the second level quantization depends on the first level quantization parameter QP1.

16. The apparatus of claim 13, wherein the quantization step and/or the rounding offset for the current video block is signaled at a level of a video region, wherein the video region is larger than a coding block, or wherein the video region is a picture or a tile, and the quantization step and/or the rounding offset for the current video block is signaled in a picture header or in a tile header, or wherein the quantization is performed for a color component of the current video block, or wherein the quantization step and/or the rounding offset for the current video block is signaled in response to a predefined condition being satisfied, or wherein the predefined condition includes at least one of: (i) the current video block contains a number of luma samples and the number being not smaller than a first predefined number threshold; (ii) a minimum size of a width and/or a height of the current video block being larger than a second predefined size threshold; (iii) the minimum size of the width and/or the height of the current video block being smaller than a third predefined size threshold; (iv) the width of the current video block being smaller than a fourth predefined width threshold and/or the height of the current video block being smaller than a fifth predefined height threshold; (v) the width of the current video block being larger than a sixth predefined width threshold and/or the height of the current video block being larger than a seventh predefined height threshold, or wherein the quantization step and/or the rounding offset for the current video block is signaled according to enable information signaled in a sequence parameter set (SPS), a picture parameter set (PPS), an adaptation parameter set (APS), a video parameter set (VPS), a sequence header, the picture header, a slice header, a tile group header, the tile, a group of coding tree unit, or wherein the enable information depends on a block dimension, Virtual Pipelining Data Units (VPDUs), a picture type, a low delay check flag, coded information of the current video block or previously coded video blocks.

17. A non-transitory computer-readable storage medium storing instructions that cause a processor to:

determine, during a conversion between a current video block and a bitstream representation of a video including the current video block, a quantization step, a rounding offset, and a quantization parameter; and perform, at least based on the quantization step, the rounding offset, and the quantization parameter, a quantization during the conversion, wherein the quantization step and/or the rounding offset for the current video block is signaled according to a coefficient position in the current video block, wherein the quantization parameter comprises a first level quantization parameter QP1 and a second level quantization parameter QP2, and the quantization includes a first level quantization corresponding to the first level quantization parameter QP1 and a second level quantization corresponding to the second level quantization parameter QP2, and wherein a first quantization step QS1 corresponding to the first level quantization parameter QP1 is defined by the second level quantization parameter QP2.

18. The non-transitory computer-readable storage medium of claim 17, wherein the quantization step and/or the rounding offset for the current video block is signaled according to at least one of (i) a block dimension and/or a block shape of the current video block, (ii) a coefficient scanning order of the current video block, (iii) whether transform or inverse transform is used, (iv) which transform or inverse transform is used, (v) a coding mode of the current video block, and (vi) the quantization parameter of the current video block signaled in a block level, a coding tree unit level, a tile group header level or a picture level, or wherein a second quantization step QS2 or a reconstruction level of the second level quantization depends on the first level quantization parameter QP1, or wherein the quantization step and/or the rounding offset for the current video block is signaled at a level of a video region, wherein the video region is larger than a coding block, or wherein the video region is a picture or a tile, and the quantization step and/or the rounding offset for the current video block is signaled in a picture header or in a tile header, or wherein the quantization is performed for a color component of the current video block, or wherein the quantization step and/or the rounding offset for the current video block is signaled in response to a predefined condition being satisfied, or wherein the predefined condition includes at least one of:
(i) the current video block contains a number of luma samples and the number being not smaller than a first predefined number threshold; (ii) a minimum size of a width and/or a height of the current video block being larger than a second predefined size threshold; (iii) the minimum size of the width and/or the height of the current video block being smaller than a third predefined size threshold; (iv) the width of the current video block being smaller than a fourth predefined width threshold and/or the height of the current video block being smaller than a fifth predefined height threshold; (v) the width of the current video block being larger than a sixth predefined width threshold and/or the height of the current video block being larger than a seventh predefined height threshold, or wherein the quantization step and/or the rounding offset for the current video block is signaled according to enable information signaled in a sequence parameter set (SPS), a picture parameter set (PPS), an adaptation parameter set (APS), a video parameter set (VPS), a sequence header, the picture header, a slice header, a tile group header, the tile, a group of coding tree unit, or wherein the enable information depends on the block dimension, Virtual Pipelining Data Units (VPDUs), a picture type, a low delay check flag, coded information of the current video block or previously coded video blocks.

19. A non-transitory computer-readable recording medium storing a bitstream of a video which is generated by a method performed by a video processing apparatus, wherein the method comprises:

determining, for a current video block, a quantization step, a rounding offset, and a quantization parameter;

performing a quantization at least based on the quantization step, the rounding offset, and the quantization parameter; and generating the bitstream based on the determining and the performing, wherein the quantization step and/or the rounding offset for the current video block is signaled according to a coefficient position in the current video block, wherein the quantization parameter comprises a first level quantization parameter QP1 and a second level quantization parameter QP2, and the quantization includes a first level quantization corresponding to the first level quantization parameter QP1 and a second level quantization corresponding to the second level quantization parameter QP2, and wherein a first quantization step QS1 corresponding to the first level quantization parameter QP1 is defined by the second level quantization parameter QP2.

20. The non-transitory computer-readable recording medium of claim 19, wherein the quantization step and/or the rounding offset for the current video block is signaled according to at least one of (i) a block dimension and/or a block shape of the current video block, (ii) a coefficient scanning order of the current video block, (iii) whether transform or inverse transform is used, (iv) which transform or inverse transform is used, (v) a coding mode of the current video block, and (vi) the quantization parameter of the current video block signaled in a block level, a coding tree unit level, a tile group header level or a picture level, or wherein a second quantization step QS2 or a reconstruction level of the second level quantization depends on the first level quantization parameter QP1, or wherein the quantization step and/or the rounding offset for the current video block is signaled at a level of a video region, wherein the video region is larger than a coding block, or wherein the video region is a picture or a tile, and the quantization step and/or the rounding offset for the current video block is signaled in a picture header or in a tile header, or wherein the quantization is performed for a color component of the current video block, or wherein the quantization step and/or the rounding offset for the current video block is signaled in response to a predefined condition being satisfied, or wherein the predefined condition includes at least one of:
(i) the current video block contains a number of luma samples and the number being not smaller than a first predefined number threshold; (ii) a minimum size of a width and/or a height of the current video block being larger than a second predefined size threshold; (iii) the minimum size of the width and/or the height of the current video block being smaller than a third predefined size threshold; (iv) the width of the current video block being smaller than a fourth predefined width threshold and/or the height of the current video block being smaller than a fifth predefined height threshold; (v) the width of the current video block being larger than a sixth predefined width threshold and/or the height of the current video block being larger than a seventh predefined height threshold, or wherein the quantization step and/or the rounding offset for the current video block is signaled according to enable information signaled in a sequence parameter set (SPS), a picture parameter set (PPS), an adaptation parameter set (APS), a video parameter set (VPS), a sequence header, the picture header, a slice header, a tile group header, the tile, a group of coding tree unit, or wherein the enable information depends on the block dimension, Virtual Pipelining Data Units (VPDUs), a picture type, a low delay check flag, coded information of the current video block or previously coded video blocks.

* * * * *